(12) United States Patent
McIntyre et al.

(10) Patent No.: US 6,229,538 B1
(45) Date of Patent: *May 8, 2001

(54) PORT-CENTRIC GRAPHIC REPRESENTATIONS OF NETWORK CONTROLLERS

(75) Inventors: Michael S. McIntyre, Travis County; Thomas R. Miller, Collin County; Daniel B. McCarthy, Travis County; Ahsan Khan, Williamson County, all of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,265

(22) Filed: Sep. 11, 1998

(51) Int. Cl.⁷ .............................. G06F 3/14; G06F 11/32; G06F 15/177
(52) U.S. Cl. ................... 345/349; 345/969; 345/966; 709/224; 709/220
(58) Field of Search .................... 345/349, 969, 345/970, 348, 964, 966, 329, 335; 709/224, 223, 220, 226, 228

(56) References Cited

U.S. PATENT DOCUMENTS

| | | | |
|---|---|---|---|
| 3,723,973 | 3/1973 | Kennedy | 340/172.5 |
| 4,864,492 | 9/1989 | Blakely-Fogel et al. | 364/200 |
| 4,897,841 | 1/1990 | Gang, Jr. | 370/85.13 |

(List continued on next page.)

FOREIGN PATENT DOCUMENTS

| | | | |
|---|---|---|---|
| 0 490 624 A2 | 6/1992 | (EP) | G06F/15/16 |
| 2206713 | 1/1989 | (GB) | G06F/15/60 |
| 2278468 | 11/1994 | (GB) | G06F/9/445 |
| WO 94/10645 | 5/1994 | (WO) | G06F/15/62 |
| WO 94/19768 | 9/1994 | (WO) | G06K/9/36 |

OTHER PUBLICATIONS

HP Router Manager (Getting Started Guide), Edition 1, Mar. 1995; Hewlett–Packard, 8000, Foothills Blv Roseville, CA 95747–6588; Publication No. 5963–2620.

Evaluating Port–Switching Hubs, Data Communications (8178), No. 9, New York, Jun. 22, 1993, pp.1–8.

*Primary Examiner*—Raymond J. Bayerl
(74) *Attorney, Agent, or Firm*—Akin, Gump, Strauss, Hauer & Feld, LLP

(57) ABSTRACT

A port-centric controller system for a computer including a plurality of network ports implemented with a plurality of network controllers and a driver system capable of operating each of the network ports in either a stand-alone mode or a team mode and that monitors the status of each of the network ports. The controller system further includes configuration logic that interfaces the driver system to display port-specific graphic representations of the configuration and status of each of the plurality of network ports. The graphic representations preferably distinguish between each of the plurality of network controllers and each of the plurality of network ports. The driver system monitors the link status of each of the network ports indicative of cable status, and the graphic representations include a corresponding cable fault icon indicative of a cable fault at a network port. The graphic representations may include separate icons for a powered off status, a hardware failure status, a cable fault status, a powered off when cable faulted status, a hardware failure when powered off status and an uninstalled controller. The graphic representations may further include an icon representing each network port in a team of network ports and an icon representing a non-active network port in the team. The graphic representations may further include team, controller, slot and bus information.

20 Claims, 17 Drawing Sheets

U.S. PATENT DOCUMENTS

| | | | |
|---|---|---|---|
| 5,040,233 | 8/1991 | Davy et al. | 382/56 |
| 5,130,975 | 7/1992 | Akata | 370/60 |
| 5,193,149 | 3/1993 | Awiszio et al. | 395/200 |
| 5,226,120 * | 7/1993 | Brown et al. | 709/224 |
| 5,241,587 | 8/1993 | Horto et al. | 379/92 |
| 5,249,218 | 9/1993 | Sainton | 379/59 |
| 5,257,387 | 10/1993 | Richek et al. | 395/800 |
| 5,261,044 | 11/1993 | Dev et al. | 395/159 |
| 5,291,479 | 3/1994 | Vaziri et al. | 370/58.2 |
| 5,293,486 | 3/1994 | Jordan et al. | 395/200 |
| 5,297,139 | 3/1994 | Okura et al. | 370/60 |
| 5,305,317 | 4/1994 | Szczepanek | 370/85.5 |
| 5,307,459 | 4/1994 | Petersen et al. | 395/200 |
| 5,309,426 | 5/1994 | Crouse et al. | 370/58.1 |
| 5,325,297 | 6/1994 | Bird et al. | 364/419.07 |
| 5,353,401 | 10/1994 | Iizawa et al. | 395/161 |
| 5,353,432 | 10/1994 | Richek et al. | 395/500 |
| 5,394,522 | 2/1995 | Sanchez-Frank et al. | 395/159 |
| 5,412,653 | 5/1995 | Hoppe et al. | 370/58.2 |
| 5,414,850 | 5/1995 | Whiting | 395/700 |
| 5,434,872 | 7/1995 | Peterson et al. | 371/57.1 |
| 5,438,528 | 8/1995 | Emerson et al. | 364/580 |
| 5,452,415 | 9/1995 | Hotka | 395/161 |
| 5,490,252 | 2/1996 | Macera et al. | 395/200.01 |
| 5,491,796 | 2/1996 | Wanderer et al. | 395/200.09 |
| 5,500,934 | 3/1996 | Austin et al. | 395/755 |
| 5,511,151 | 4/1996 | Russell et al. | 395/114 |
| 5,515,376 | 5/1996 | Murthy et al. | 370/85.13 |
| 5,530,847 | 6/1996 | Schieve et al. | 395/183.4 |
| 5,541,957 | 7/1996 | Lau | 375/258 |
| 5,561,669 | 10/1996 | Lenney et al. | 370/60.1 |
| 5,568,525 | 10/1996 | De Nijs et al. | 375/356 |
| 5,574,722 | 11/1996 | Slykhouse et al. | 370/56 |
| 5,574,907 | 11/1996 | Jernigan, IV et al. | 395/601 |
| 5,592,472 | 1/1997 | Grant et al. | 370/351 |
| 5,600,644 | 2/1997 | Chang et al. | 370/404 |
| 5,606,559 | 2/1997 | Badger et al. | 370/395 |
| 5,613,123 | 3/1997 | Tsang et al. | 395/651 |
| 5,617,418 | 4/1997 | Shirani et al. | 370/465 |
| 5,640,248 | 6/1997 | Hirokawa | 358/406 |
| 5,668,970 | 9/1997 | Cowart et al. | 711/206 |
| 5,671,413 | 9/1997 | Shipman et al. | 395/652 |
| 5,673,392 | 9/1997 | Nakashima et al. | 395/200.01 |
| 5,732,087 | 3/1998 | Lauer et al. | 370/416 |
| 5,737,525 | 4/1998 | Picazo, Jr. et al. | 395/200.02 |
| 5,748,629 | 5/1998 | Caldara et al. | 370/389 |
| 5,751,965 * | 5/1998 | Mayo et al. | 709/224 |
| 5,819,042 | 10/1998 | Hansen | 395/200.52 |
| 5,819,115 | 10/1998 | Hoese et al. | 395/888 |
| 5,822,305 * | 10/1998 | Vaishnavi et al. | 709/224 X |
| 5,831,610 * | 11/1998 | Tonelli et al. | 345/335 |
| 5,845,062 * | 12/1998 | Branton, Jr. et al. | 709/223 X |
| 5,856,999 | 1/1999 | Robinson et al. | 375/221 |

\* cited by examiner

PORT-CENTRIC GRAPHIC REPRESENTATIONS OF NETWORK CONTROLLERS

FIELD OF THE INVENTION

The present invention relates to computer networking systems, and more particularly to a method and apparatus for providing port-centric graphic representations of network controllers.

DESCRIPTION OF THE RELATED ART

Computers and other devices may be networked together using any one of several available architectures and any one of several corresponding and compatible network protocols. A common network architecture is Ethernet™, such as the 10Base-T and 100Base-TX Ethernet™ Standards according to the IEEE Standard 802.3, although another Ethernet™ architecture operating at 1 Gigabit per second (Gbps) is also available. In an Ethernet™ architecture, the computers each include a bus system with corresponding slots for receiving compatible network adapter expansion cards, where one or more of the adapter cards may be network interface cards (NICs). Each NIC includes an appropriate connector for interfacing a compatible network cable, such as a coaxial cable, a twisted-wire cable, a fiber optic cable, etc. For example, in a star configuration, each NIC includes an RJ-45 connector for receiving a compatible RJ-45 plug of a twisted-wire cable, where each network cable is coupled to a central device such as a repeater, hub, switch, etc.

In a packet-switched configuration, each computer or device sends data packets according to a selected upper level protocol, such as Transmission Control Protocol/Internet Protocol (TCP/IP), the Internet Protocol eXchange (IPX), NetBEUI or the like. NetBEUI is short for NetBIOS Enhanced User Interface, and is an enhanced version of the NetBIOS protocol used by network operating systems such as LAN Manager, LAN Server, Windows for Workgroups, Windows 95 and Windows NT. NetBEUI was originally designed by IBM for IBM's LAN Manager server and later extended by Microsoft and Novell. TCP/IP is used in Internet applications, or in intranet applications such as a local area network (LAN). In this manner, computers and other devices share information according to the higher level protocols.

One or more computers in a network configuration typically operates as a server for other computers and devices in the network. Often, the other computers and devices rely on the server(s) for information, storage, access to databases, programs, other networks, etc., and various other services. It is desired that the server be as reliable as possible. Each computer, including the server, is typically coupled to a computer using a single network controller or adapter. If the network controller fails, the access to the server is interrupted resulting in loss of productivity and inefficiency. It is further desired to provide as high a bandwidth path to the server as possible, especially during periods of heavy demand and increased network traffic. A single network controller results in a bottleneck of data flow.

It is desirable to improve the network efficiency and fault tolerance of a network in a practical and cost effective manner. It is also desirable to display the status and configuration of each port in an accurate and efficient manner.

SUMMARY OF THE INVENTION

A port-centric controller system for a computer according to the present invention includes a plurality of network ports implemented with a plurality of network controllers and a driver system capable of operating each of the network ports in either a stand-alone mode or a team mode where each team includes at least two network ports. The driver system monitors the status of each of the network ports. The controller system further includes configuration logic that interfaces the driver system to display port-specific graphic representations of the configuration and status of each of the plurality of network ports. The graphic representations preferably distinguish between each of the plurality of network controllers and each of the plurality of network ports.

Several different graphic icons may be used to illustrate the status and configuration information. The driver system monitors the link status of each of the network ports indicative of cable status, and the graphic representations include a corresponding cable fault icon indicative of a cable fault at a network port. The graphic representations may include separate icons for a powered off status, a hardware failure status and the cable fault status. The graphic representations may further include an icon representing a powered off when cable faulted status, an icon representing a hardware failure when powered off status and an icon representing detection of an uninstalled network controller. The graphic representations may further include an icon representing each network port in a team of network ports and an icon representing a non-active network port in the team. The graphic representations may further include team, controller, slot and bus information.

A computer system according to the present invention may include a processor, a main memory, a bus system coupled to the processor and the main memory and a plurality of network controllers for implementing a plurality of network ports. The computer system further includes a driver system and a configuration application, each executed by the processor from the main memory. The driver system is capable of operating each of the network ports in either a stand-alone mode or a team mode. The driver system monitors the status of each of the network ports and the configuration application interfaces the driver system to display port-specific graphic representations of the configuration and status of each of the plurality of network ports.

It is now appreciated that a port-centric controller system according to the present invention provides a user with a more accurate representation of the status and configuration of each port in a computer. Rather than displaying each port as a controller, the status and configuration of each port is represented using appropriate port-specific icons. The team configurations are also illustrated in an accurate manner so that the user is able to easily determine and re-configure the one or more teams of ports.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
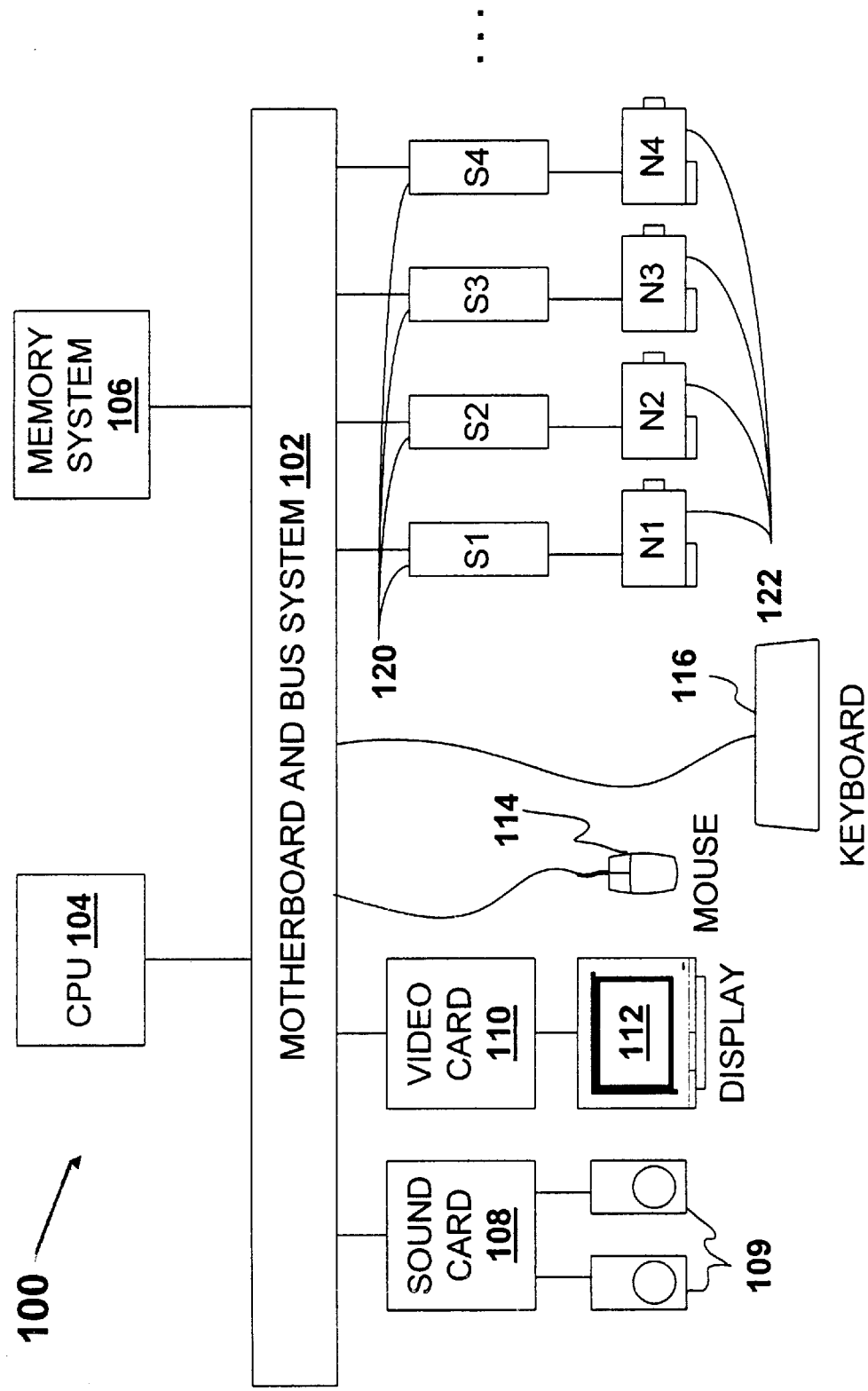
FIG. 1 is a block diagram of an exemplary computer system used in conjunction with the present invention.

FIG. 1 is a block diagram an exemplary computer system 100 that is used to illustrate various aspects of a network system implemented according to the present invention. The computer system 100 is preferably an IBM-compatible, personal computer (PC) system or the like, and includes a motherboard and bus system 102 coupled to at least one central processing unit (CPU) 104, a memory system 106, a video card 110 or the like, a mouse 114 and a keyboard 116. The motherboard and bus system 102 includes any kind of bus system configuration, such as any combination of a host bus, one or more peripheral component interconnect (PCI) buses, an industry standard architecture (ISA) bus, an extended ISA (EISA) bus, microchannel architecture (MCA) bus, etc., along with corresponding bus driver circuitry and bridge interfaces, etc., as known to those skilled in the art. The CPU 104 preferably incorporates any one of several microprocessors and supporting external circuitry typically used in PCs, such as the 80486, Pentium™, Pentium II™, etc. microprocessors from Intel Corp., or other similar type microprocessors such as the K6 microprocessor by Advanced Micro Devices. The external circuitry preferably includes an external or level two (L2) cache or the like (not shown). The memory system 106 may include a memory controller or the like and be implemented with one or more memory boards (not shown) plugged into compatible memory slots on the motherboard, although any memory configuration is contemplated.

Other components, devices and circuitry are normally included in the computer system 100 are not particularly relevant to the present invention and are not shown. Such other components, devices and circuitry are coupled to the motherboard and bus system 102, such as, for example, an integrated system peripheral (ISP), an interrupt controller such as an advanced programmable interrupt controller (APIC) or the like, bus arbiter(s), one or more system ROMs (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc. Although the present invention is illustrated with an IBM-compatible type PC system, it is understood that the present invention is applicable to other types of computer systems and processors as known to those skilled in the art.

The computer system 100 includes one or more output devices, such as speakers 109 coupled to the motherboard and bus system 102 via an appropriate sound card and a monitor or display 112 coupled to the motherboard and bus system 102 via an appropriate video card 110. One or more input devices may also be provided such as a mouse 114 and keyboard 116, each coupled to the motherboard and bus system 102 via appropriate controllers (not shown) as known to those skilled in the art. Other input and output devices may also be included, such as one or more disk drives including floppy and hard disk drives, one or more CD-ROMs, as well as other types of input devices including a microphone, joystick, pointing device, etc. The input and output devices enable interaction with a user of the computer system 100 for purposes of configuration, as further described below.

The motherboard and bus system 102 is preferably implemented with one or more expansion slots 120, individually labeled S1, S2, S3, S4 and so on, where each of the slots 120 is configured to receive compatible adapter or controller cards configured for the particular slot and bus type. Typical devices configured as adapter cards include network interface cards (NICs), disk controllers such as a SCSI (Small Computer System Interface) disk controller, video controllers, sound cards, etc. The computer system 100 may include one or more of several different types of buses and slots, such as PCI, ISA, EISA, MCA, etc. In the embodiment shown, a plurality of NIC adapter cards 122, individually labeled N1, N2, N3 and N4, are shown coupled to the respective slots S1–S4. The slots 120 and the NICs 122 are preferably implemented according to PCI, although any particular bus standard is contemplated.

As described more fully below, each of the NICs 122 enables the computer system to communicate with other devices on a corresponding network. The computer system 100 may be coupled to at least as many networks as there are NICs 122, or two or more of the NICs 122 may be coupled to the same network via a common network device, such as a hub or a switch. When multiple NICs 122 are coupled to the same network, each provides a separate and redundant link to that same network for purposes of fault tolerance or load balancing, otherwise referred to as load sharing. Each of the NICs 122, or N1–N4, preferably communicate using packets, such as Ethernet™ packets or the like. As known to those skilled in the art, a destination and source address is included near the beginning of each Ethernet™ packet, where each address is at least 48 bits for a corresponding media access control (MAC) address. A directed or unicast packet includes a specific destination address rather than a multicast or broadcast destination. A broadcast bit is set for broadcast packets, where the destination address are all ones (1's). A multicast bit in the destination address is set for multicast packets.

Figure 2:
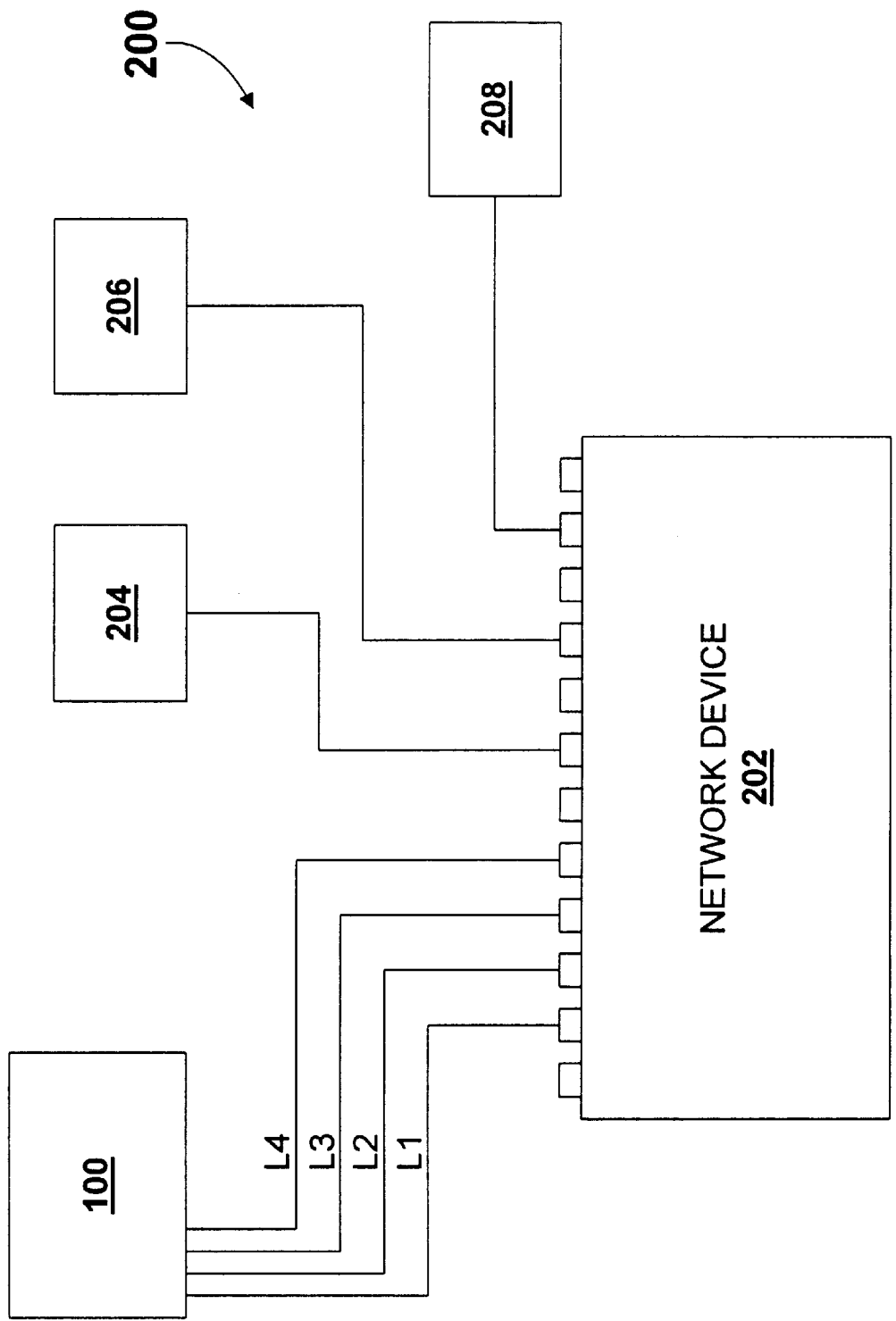
FIG. 2 is a block diagram of the computer system of FIG. 1 coupled to a network.

Referring now to FIG. 2, a block diagram is shown of a network 200 that enables the computer system 100 to communicate with one or more other devices, such as devices 204, 206 and 208 as shown. The devices 204, 206 and 208 may be of any type, such as another computer system, a printer or other peripheral device, or any type of network device, such as a hub, a repeater, a router, a brouter, etc. The computer system 100 and the devices 204–208 are communicatively coupled together through a multiple port network device 202, such as a hub or switch, where each is coupled to one or more respective ports of the network device 202. The network 200, including the network device 202, the computer system 100 and each of the devices 204–208, may operate according to any network architecture, such as Ethernet™, Token Ring, etc., or combinations of such architectures In the embodiment shown, the network 200 operates according to Ethernet™, such as such as 10BaseT at 10 Megabits per second (Mbps), 100BaseTX at 100 Mbps, or 1 Gigabits per second (1 Gbps) Ethernet™. The network 200 may be form any type of Local Area Network (LAN) or Wide Area Network (WAN), and may comprise an intranet and be connected to the Internet. For example, the device 208 may comprise a router that connects to an Internet provider.

The computer system 100 is coupled to the network device 202 via a plurality of links L1, L2, L3 and L4. The NICs N1–N4 each comprise a single port to provide a respective link L1–L4. It is noted that the computer system 100 may be coupled to the network device 202 via any number of links from one to a maximum number, such as sixteen (16). Also, any of the NICs may have any number of ports and is not limited to one.

The use of multiple links to a single device, such as the computer system 100, provides many benefits, such as fault tolerance or load balancing. In fault tolerance mode, one of the links, such as the link L1 and the corresponding NIC N1 is active while one or more of the remaining NICs and links are in standby mode. If the active link fails or is disabled for any reason, the computer system 100 switches to another NIC and corresponding link, such as the NIC N2 and the link L2, to continue or maintain communications. Although two links may provide sufficient fault tolerance, three or more links provides even further fault tolerance in the event two or more links become disabled or fail. For load balancing, the computer system 100 may distribute data among the redundant links according to any desired criterion to increase data throughput.

Figure 3:
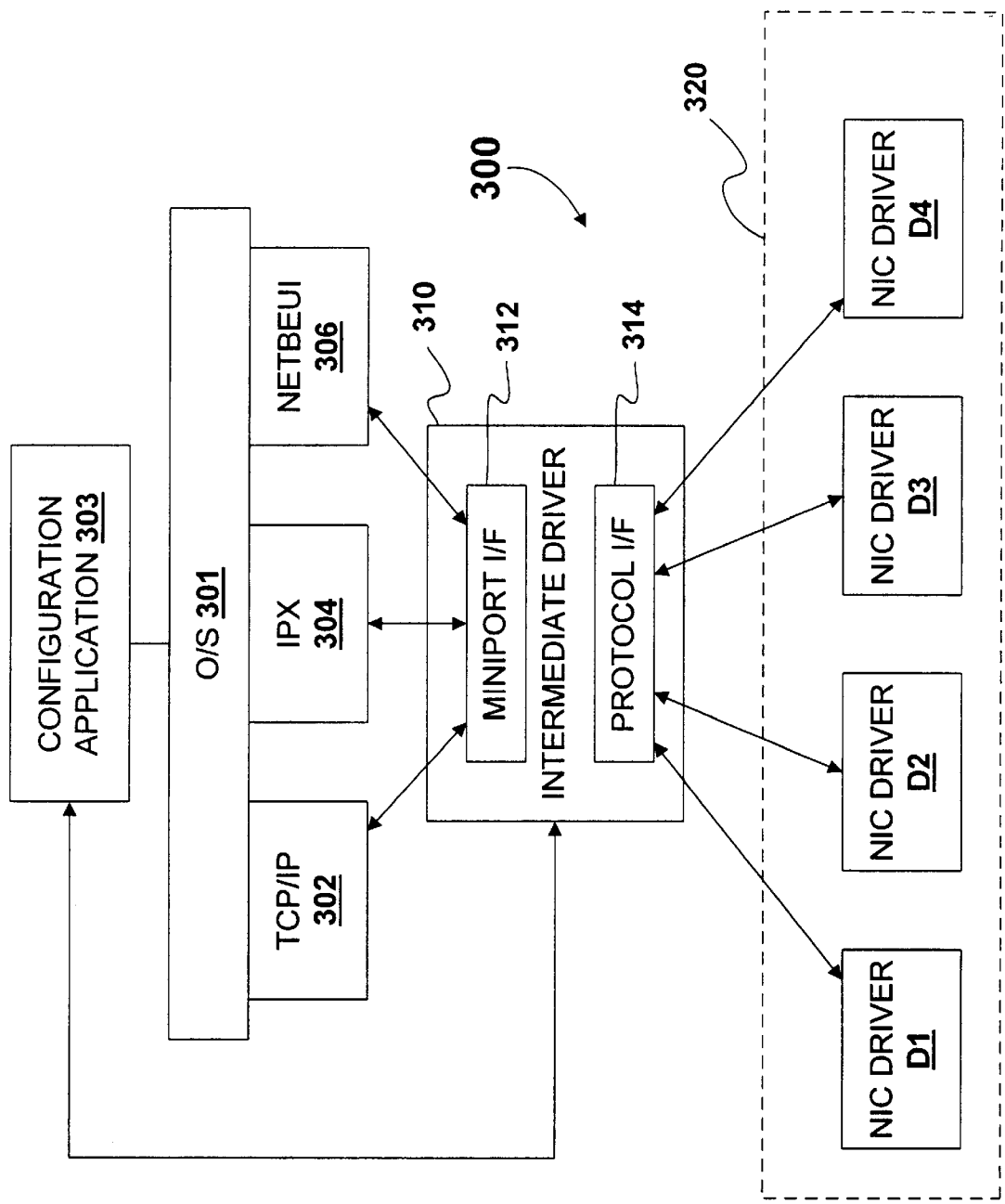
FIG. 3 is a block diagram of a controller system installed on the computer system of FIG. 1 and implemented according to the present invention.

FIG. 3 is a block diagram of a controller system 300 installed on the computer system 100 and implemented according to the present invention to enable teaming of any number of NIC ports to act like a single virtual or logical device. As shown in FIG. 3, four NIC drivers D1–D4 are installed on the computer system 100, each for supporting and enabling communications with a respective port of one of the NICs N1–N4. The computer system 100 is installed with an appropriate operating system (O/S) 301 that supports networking, such as Microsoft NT, Novell Netware, or any other suitable network operating system. The O/S 301 includes, supports or is otherwise loaded with the appropriate software and code to support one or more communication protocols, such as TCP/IP 302, IPX (Internet Protocol eXchange) 304, NetBEUI (NETwork BIOS End User Interface) 306, etc. Normally, each protocol binds with one NIC driver to establish a communication link between a computer and the network supported by the bound NIC. In general, binding a NIC port associates a particular communication protocol with the NIC driver and enables an exchange of their entry points. Instead, in the controller system 300, an intermediate driver 310 is installed as a stand alone protocol service that operates to group two or more of the NIC drivers D1–D4 so that the corresponding two or more ports function as one logical device.

In particular, each of the protocols 302–306 bind to a miniport interface (I/F) 312, and each of the NIC drivers D1–D4 bind to a protocol I/F 314, of the intermediate driver 310. In this manner, the intermediate driver 310 appears as a NIC driver to each of the protocols 302–306. Also, the intermediate driver 310 appears as a single protocol to each of the NIC drivers D1–D4 and corresponding NICs N1–N4. The NIC drivers D1–D4 (and the NICs N1–N4) are bound as a single team 320 as shown in FIG. 3. It is noted that a plurality of intermediate drivers may be included on the computer system 100, where each binds two or more NIC drivers into a team. Thus, the computer system 100 may support multiple teams of any combination of ports of installed NICs and NIC drivers. Each team, such as the team 320, is configured to support fault tolerance or load balancing, such as the Fast EtherChannel by Cisco Systems, Inc. By binding two or more ports of physical NICs to the protocol I/F of the intermediate driver, data can be routed through one port or the other, with the protocols interacting with only one logical device.

A configuration application 303 is also included that interfaces with the intermediate driver 310 to enable a user of the computer system 100 via one or more input devices, such as the mouse 114 and the keyboard 116 and one or more output devices, such as the display 112, to combine two or more NIC ports and corresponding NIC drivers into a team, such as the team 320, and to configure the mode of operation of the formed team. A fault tolerance team is defined by having one port actively transmitting and receiving and having one or more ports in a standby or idle state. If the active port becomes disabled or fails for any reason, a failover occurs where a standby port becomes the active port. There are at least three fault tolerance (FT) modes from which to choose. In a "Manual" mode, a failover. occurs when a "Switch Now" button 402 (FIG. 4A), displayed by the configuration application 303 and the display 112, is pressed by the user regardless of whether the active port is in a failed state. In a "Switch On Fail" mode, a failover occurs when the active port loses link or stops receiving. In a "SmartSwitch" mode, a failover occurs when the active port loses link or stops receiving and switches back to the original active port when that port comes back online. A load balancing or load sharing team is defined by having all ports in the team actively transmitting and receiving.

Figure 4A:
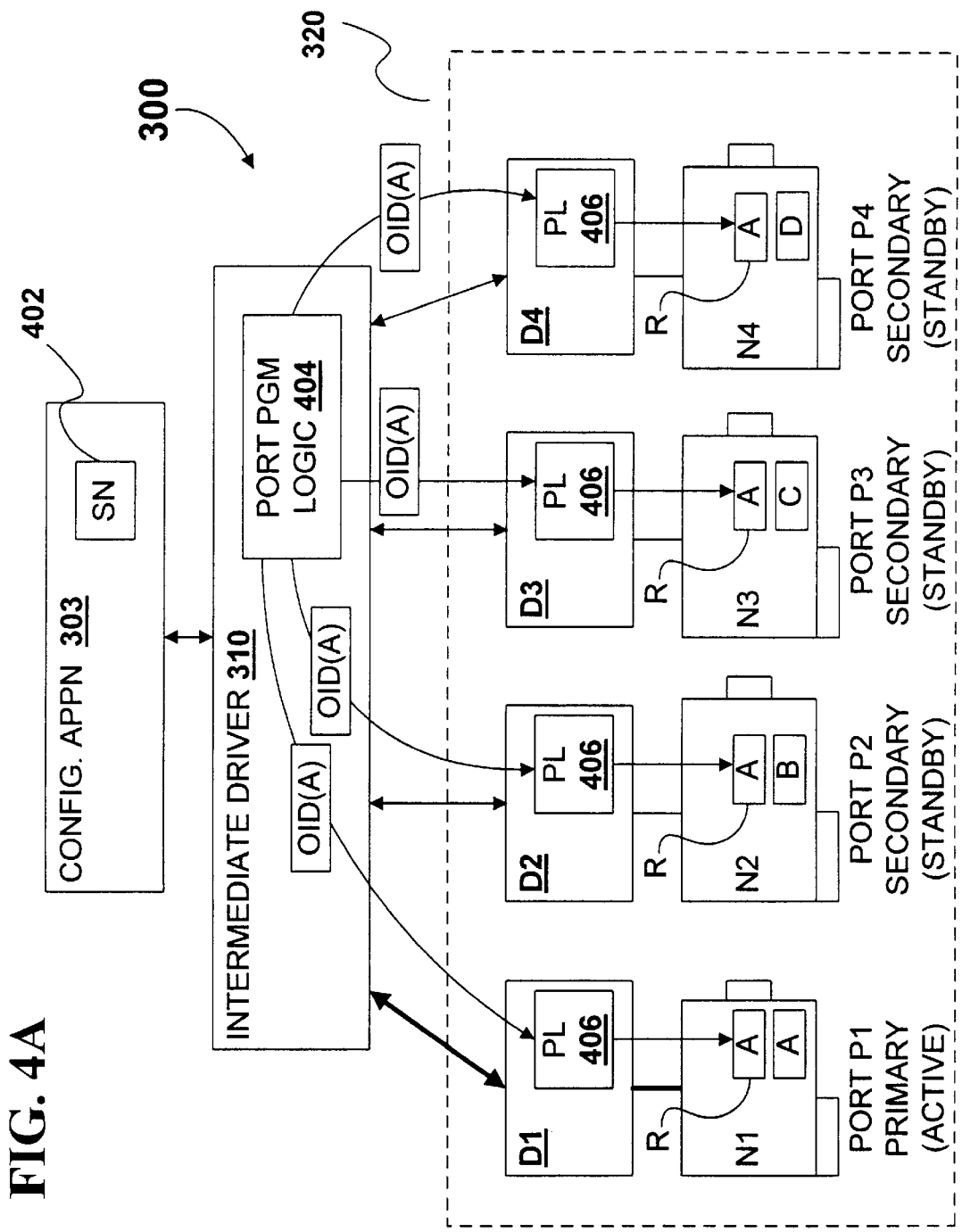
FIG. 4A is a block diagram illustrating the controller system of FIG. 3 configured for a fault tolerance mode while operating in a single receive address mode.

FIG. 4A is a block diagram illustrating the controller system 300 configured for fault tolerance mode while operating in a single receive address mode. The team 320 is shown including the NIC drivers D1–D4 and the NICs N1–N4, which are collectively referred to as ports P1–P4, respectively. It is understood, however, as shown below, that one or more multiple port NICs may be included, where the NIC ports may be divided among teams. Upon initialization, or during operation, the user commands via the configuration application 303 to group all of ports P1–P4 into a fault tolerance, single receive address mode and in any one of the particular FT modes. Each of the NICs N1–N4 is preprogrammed with a unique, burned-in 48-bit media access control (MAC) address from the factory, where the MAC addresses are referred to as A, B, C and D, respectively. The intermediate driver 310 includes port program logic 404 that commands the NIC drivers D1–D4 to program an override register (R) of each of the NICs N1–N4 with the same receive address "A", where the selected address is the same as the primary port P1. The override register R is a programmable memory that enables storage of a locally administered address (LAA), which is read by the NIC at restart (a one-shot read) if programmed with an override receive address. Each of the NIC drivers D1–D4 includes program logic 406 that receives a command including the override receive address from the port program logic 404 of the intermediate driver 310. As shown in FIG. 4A, the command is preferably in the form of an Operation Identifier (OID). NIC drivers typically include a plurality of standard OIDs that are usually sent from upper level protocols. The standard OIDs, however, do not include an override receive address OID.

When programmed in this manner for the single receive address mode, the NIC ignores packets received at its port(s) having a destination address equal to its pre-programmed address and instead retrieves packets with the override receive address programmed into the override register R as the destination address, which is destination address A for each of the NICs N1–N4. Of course, the NIC N1 for the primary port P1 need not be programmed since already set to receive address A. For each FT mode, one of the ports, such as the port P1, is selected by the intermediate driver 310 as the primary port which is initially active during operation. The remaining ports P2–P4 are secondary ports that initially are in standby mode.

During operation, the intermediate driver 310 inserts address A as the source address of packets transmitted via the port P1 by the NIC N1, and the network device 202 sends packets with destination address A to the computer system 100 via the link L1 to port P1. If the network device 202 is a hub or repeater, it repeats all packets out every other port. If the network device 202 is a switch, however, it learns that a device with address A is coupled via the link L1. If operating in the FT Manual Mode, the configuration application 303 detects assertion of the switch now button 402 by the user via an input device, such as the mouse 114 or keyboard 116, and switches the active port to one of the standby ports, such as the port P2. The user may have pressed the switch now button 402 if port P1 (or the NIC N1) has stopped responding (failed) as reported by the intermediate driver 310 to the configuration application 303 or simply as a matter of choice (standby). When commanded to switch to port P2, the intermediate driver 310 sends packets via port P2 by the NIC N2 instead of port P1, but still uses the address A as the source address for the packets. If the network device 202 is a hub or a repeater, no other change is necessary. If the network device 202 is a switch, it learns that the device with source address A has moved from link L1 to L2, and begins sending packets with destination address A to the computer system 100 via the link L2.

Figure 4B:
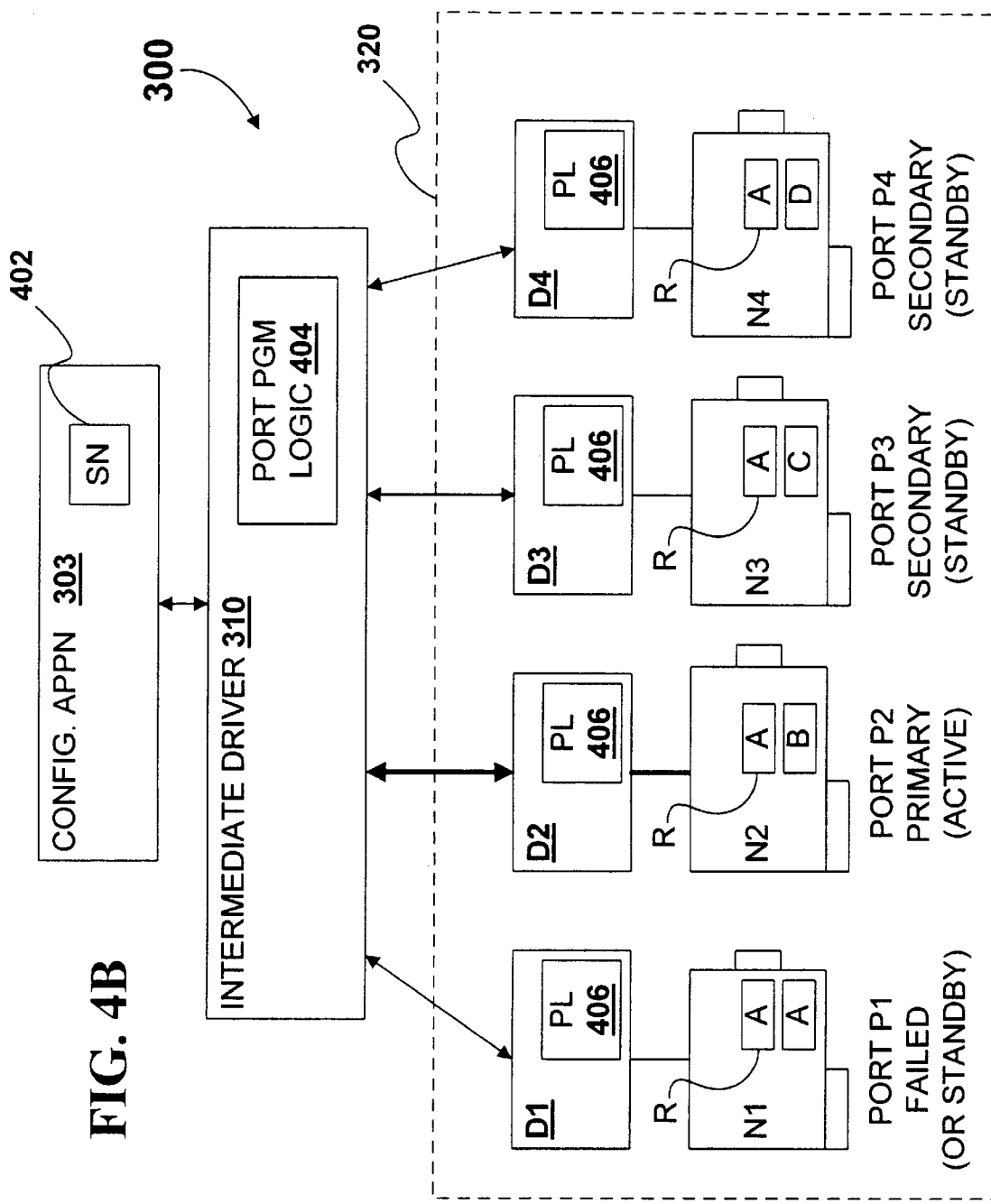
FIG. 4B is a block diagram illustrating the controller system of FIG. 3 and configured as shown in FIG. 4A performing a failover in the event of failure of the primary port.

If operating in the FT Switch On Fail Mode, the intermediate driver 310 detects failure of the primary port P1 and fails over to one of the standby ports, such as the port P2 and the NIC N2 as shown in FIG. 4B. The intermediate driver 310 stays with the new primary port P2 until it fails, and if so, selects another operable standby port. If operating in the FT SmartSwitch Mode, after failover from the primary port, such as the port P1, the intermediate driver 310 switches back to the previously active port P1 if and when the intermediate driver 310 detects the NIC N1 back online. In any of the fault tolerance modes, the significant advantage of the single receive address mode is that the failover does not require a change of the receive address of the new primary port. Since all of ports P1–P4 in the team are programmed with the same receive address A, the failover occurs as soon as the intermediate driver 310 detects failure of the primary port, or at least as soon as the user presses the switch now button 402 in FT Manual Mode. After the failover as shown in FIG. 4B, the intermediate driver 310 inserts the address A as the source address of the new primary port P2, which is properly handled by the network device 200 regardless of whether it is a switch, hub or repeater.

When two or more NIC ports are operating as a team, the intermediate driver 310 continuously or periodically determines the status of each NIC and whether each NIC is functioning properly. Heartbeat packets are transmitted from one or more NIC ports to one or more of the other NIC ports as a test to determine the status of functionality of the receiving NIC(s). The heartbeat packet may be a broadcast packet. A broadcast packet, however, by definition, is sent to all devices in the network. For example, as shown in FIG. 2, a broadcast packet sent from the computer system 100 on any of the links L1–L4 in the network 200 is copied and transmitted by the network device 202 to every other port, whether a repeater or a switch, so that the broadcast packet is transmitted on every other link L1–L4 and to each of the devices 204, 206 and 208, as well as to any other devices coupled to the network device 202. Each device that receives a broadcast packet, including the NICs N1–N4, must process the broadcast packet to determine if intended for it. Each computer in the network 200 receiving the broadcast packet generates an interrupt and the packet is passed to higher level protocols, where the packet is ultimately dropped or otherwise rejected. In fact, every device must process the received broadcast packet even though the packet is ultimately discarded by all unintended devices. This is an inefficient solution since the network 200 is flooded with substantial (and mostly, unnecessary) network overhead traffic. The problem is made worse by the fact that heartbeat packets are usually sent on a periodic basis.

Figure 5:
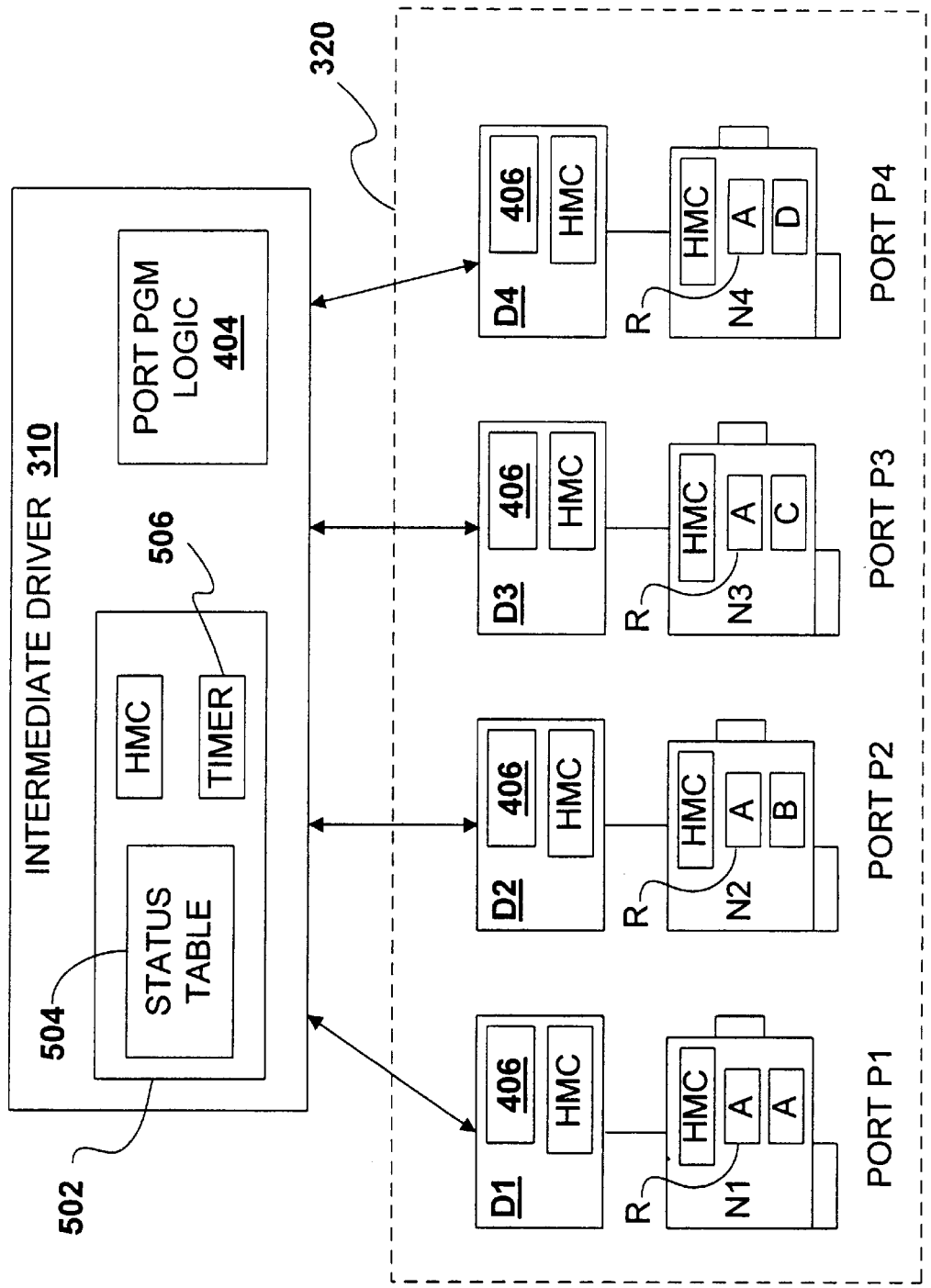
FIG. 5 is a block diagram illustrating the controller system of FIG. 3 configured for heartbeat multicast packets using a heartbeat multicast address.

FIG. 5 is a block diagram illustrating one embodiment in which the intermediate driver 310 defines a Heartbeat Multicast Address (HMC) and where the intermediate driver 310 causes each NIC team member to register the HMC address. Upon power-up, boot or initialization, the O/S 301 starts each of the NIC drivers D1–D4 and the intermediate driver 310. The intermediate driver 310 detects and collects any and all multicast addresses (not shown) supported by each supported higher level protocol, such as the TCP/IP 302, IPX 304 and NetBEUI 306, and appends its own multicast address(es), which includes the HMC address. The intermediate driver 310 then requests that each NIC driver D1–D4 register the list of multicast addresses, including the HMC address. As shown in FIG. 5, each NIC driver D1–D4 and the corresponding NICs N1–N4 are programmed to detect the single node address A and the HMC address. It is noted that although only the HMC address is shown, each NIC driver D1–D4 may be programmed with a table of multicast addresses. The intermediate driver 310 also includes heartbeat logic 502 that includes memory for storing the HMC address and a status table 504 that maintains the status of each of the ports P1–P4 (including the NIC drivers D1–D4 and the NICs N1–N4) of the team. The intermediate driver 310 also includes a timer or timer logic 506 that determines the heartbeat period for checking the status of the ports P1–P4. The heartbeat period is referred to as the HEARTBEAT_TIMER_SPEED.

Figure 6:
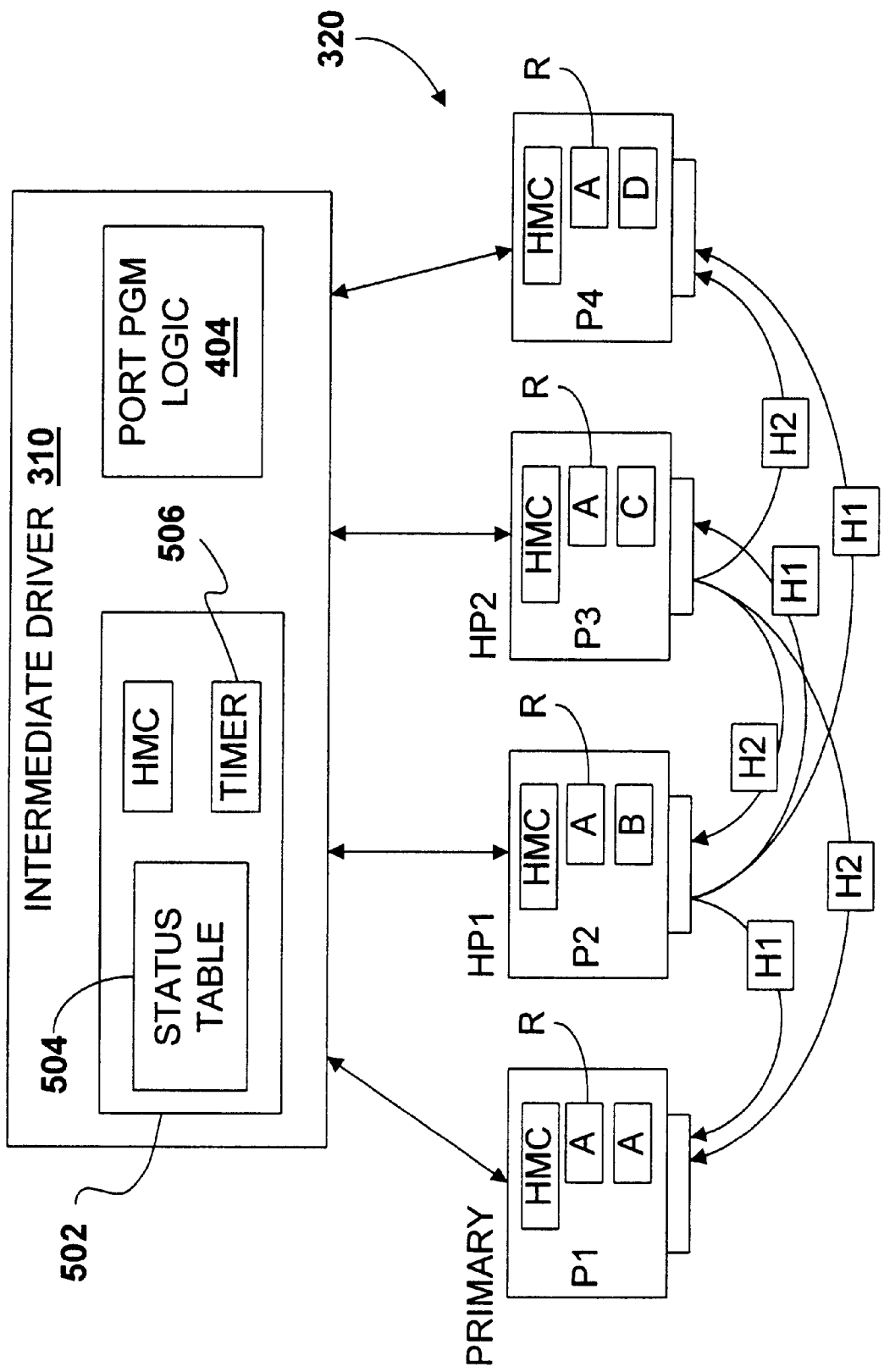
FIG. 6 is a block diagram illustrating the controller system of FIG. 3 configured as shown in FIG. 5 and transmitting heartbeat multicast packets.

FIG. 6 is a block diagram illustrating multicast heartbeat packets that are sent for the team 320. Each of the NIC drivers D1–D4 (and associated NICs N1–N4) are collectively shown as ports P1–P4, where P1 is the initial primary port. The intermediate driver 310 selects two ports, such as ports P2 and P3, to transmit multicast heartbeat packets, labeled HP1 and HP2, respectively. Two heartbeat ports are needed in order to test each other since each port receives a copy of the multicast packet through an internal wrapping mechanism. It is desired to select two heartbeat ports other than the primary port to leave the primary port available for its primary traffic responsibilities. If there are only two ports in a team, then both ports, including the primary port, send multicast heartbeat packets to monitor each other. The intermediate driver 310 causes the heartbeat port P2 to send a heartbeat packet H1 via the link L2 as needed or on a periodic basis. The intermediate driver 310 also causes the heartbeat port P3 to periodically send a heartbeat packet H2 via the link L3 as needed or on a periodic basis. The user may program the heartbeat period via the configuration application 303 to a value different from a default heartbeat period of approximately 3 seconds. The timer logic 506 is programmed accordingly, and is used by the heartbeat logic 502 to check and update the status of the ports P1–P4, and to determine whether and when to send multicast heartbeat packets. The network device 202 repeats and transmits each of the heartbeat packets H1 and H2, so that the ports P1, P3 and P4 each receive the heartbeat packet H1 from the heartbeat port P2, and the ports P1, P2 and P4 each receive the heartbeat is packet H2 from the heartbeat port P3 as shown in FIG. 6.

The intermediate driver 310 inserts source address B and destination address HMC for the heartbeat packet H1 from the heartbeat port P2 and inserts source address C and destination address HMC for the heartbeat packet H2 from the heartbeat port P3. The ports P1 and P4, if operating correctly, each receive and process both heartbeat packets H1 and H2. Port P2 receives the heartbeat packet H2 from port P3 and port P3 receives and processes the heartbeat packet H1 from port P2. It is noted that if the network device 202 repeats the heartbeat packet H1 to port P2 or H2 to port 3, then port P2 detects its own source address B and ignores the H1 packet and port 3 detects its own source address C and ignores the H2 packet. The heartbeat packets H1 and H2 received and processed by the ports P1–P4 are passed to the intermediate driver 310, which updates the status table 504. All other devices coupled to the network device 202, such as the devices 204, 206 and 208, may receive both heartbeat packets H1 and H2, but detect the HMC destination address and drop the packets without processing them. In this manner, the multicast heartbeat packets H1 and H2 are handled much more efficiently than broadcast heartbeat packets.

The intermediate driver 310 periodically updates the status table 504 based on received and processed packets including the multicast heartbeat packets H1 and H2 for each of the ports P1–P4. If no receives have been indicated by a port at the time of the update, the intermediate driver 310 changes state of that port to the next subsequent entry in the list provided in the following Table 1:

TABLE 1

| State | Port State Description |
|---|---|
| HEARTBEAT_MODE_OK (OK) | The port is sending and receiving correctly. |
| HEARTBEAT_MODE_RETRY (RETRY) | The port did not receive a directed packet or a multicast Heartbeat packet within the last Heartbeat Time Interval. A request is made to have a Heartbeat sent to this port |
| HEARTBEAT_MODE_DETECT (DETECT) | The port made a request on the last timer and is now awaiting a receive. If no receive happens, the port is failed |
| HEARTBEAT_MODE_FML (FAIL) | The port is failed. Another request is made to have a Heartbeat sent to this port. Only a directed packet or Heartbeat multicast puts this port back into the OK state |

It is noted that any directed packet or heartbeat multicast packet resets the port back to the OK state from any other state, including the FAIL state. Thus, if the primary port is receiving packets more often than the heartbeat period, then it remains in the OK state. In the fault tolerance modes, however, the standby ports are generally idle and would otherwise step through the RETRY, DETECT and FAIL states rather quickly without the heartbeat packets. After a failover, heartbeat packets should be sent in case the network device 202 is a switch to notify the switch of the change in sending/receiving node address. If the primary port and all of the secondary ports go to FAIL status, a flurry of heartbeats are requested to be sent from all ports to all ports. If any port receives a packet, it's state is updated to OK and if the primary port is still not receiving, a failover occurs if any one of the standby ports is in the OK state.

The timer logic 506 also includes a timer routine referred to as CheckState, which occurs every STATE_TIMER_SPEED interval. The STATE_TIMER_SPEED interval is shorter than the HEARTBEAT_TIMER_SPEED. When CheckState occurs, a counter is incremented to note the time elapsed since the last Heartbeat check, and if the time is greater than or equal to HEARTBEAT_TIMER_SPEED, the heartbeat state is confirmed. The intermediate driver 310 updates the heartbeat status only on directed or multicast heartbeat packets. If a heartbeat state confirmation is called and no receive has occurred, the status is updated to the next state.

Multicast heartbeat packets provide several advantages over broadcast heartbeat packets and directed heartbeat packets. As compared to broadcast heartbeat packets, multicast heartbeat packets are processed only by the intended devices. Directed heartbeat packets, as further described below, may not be used in the single receive address mode since each NIC port is programmed with the same receive address. Also, a single multicast heartbeat packet may be used to test the other ports in the same team since all are programmed to receive the same multicast address and the packet is repeated to all team members. A second multicast heartbeat packet is also sent to the sender of the first heartbeat's receive capability.

The intermediate driver 310 also maintains two other states in the status table 504 for each team member port, including a WIRE_CABLE_FAULT state and a POWER_FAILURE state. The WIRE_CABLE_FAULT state indicates that a status event was sent by the NIC driver informing the intermediate driver 310 that a wire fault has occurred, such as when a link or link signal is no longer detected. No heartbeat packet requests are handled until an event has been issued by the NIC driver indicating that link has been restored. When a NIC driver detects a cable-fault, it sends a status change to NDIS (Network Driver Interface Specification) which in turn notifies the intermediate driver 310 in PtStatus. The status event is then marked for action by the intermediate driver 310.

Upon a link-state change, the intermediate driver 310 sends OID_GEN_MEDIA_CONNECT_STATUS to all of bound lower NIC drivers and updates their status within the intermediate driver 310. If the primary port is found to be in fault, a failover occurs to the next port that has a status of OK or that can verify a good link status.

The POWER_FAILURE state indicates that a status event was sent by the port informing the intermediate driver 310 that power has been lost (i.e. Hot Plug). No Heartbeat requests are handled until an event has been issued by the port indicating that power has been restored.

The user may configure a team for load balancing in the single receive address mode if the intermediate driver 310 also sends each packet with the same source address as the receive address. This is particularly true for TCP/IP, since the IP (Internet Protocol) address of the computer system 100 is associated with one MAC address, such as the MAC address A of the primary port P1. For the IPX and NetBEUI protocols, the load balancing mode in the single receive address mode may cause the remote device to respond to the sending NIC which is not programmed to retrieve that packet. Thus, the intermediate driver 310 uses the address A as the source address for any packets transmitted by any of the ports P1–P4 and the addresses B, C and D are not used. Also, the network device 202 could not be a hub or repeater since the computer system 100 would receive duplicate packets at the ports P1–P4 from other devices. And, although the network device 202 could be a regular switch, it would not operate very efficiently since it supports a given address at only one port and would determine that the device with destination address A was constantly moving between the links L1–L4. Instead, the network device 202 should be a switch that supports the port aggregation protocol. In this manner, the ports associated with the links L1–L4 of the switch 202 are aggregated and effectively treated as a single port, much like the team of ports P1–P4 are treated by the intermediate driver 310.

The intermediate driver 310 distributes transmission of packets among the team, such as the team 320, including the ports P1–P4 as shown in FIG. 6. Since it is desired to maintain packet ordering, the intermediate driver 310 distributes remote destination addresses among the team ports rather than distributing individual packets, so that a group of packets going to a given device are sent via the same port. For example, if the computer system 100 is sending packets to devices with addresses W, X, Y and Z, the intermediate driver 310 may select port P1 for device W, port P2 for device X, port P3 for device Y and port P4 for device Z. In this manner, all packets transmitted to device W are transmitted via port P1, all packets transmitted to device X are transmitted via port P2, all packets transmitted to device Y are transmitted via port P3 and all packets transmitted to device Z are transmitted via port P4, and so on.

Several methods may be used for distributing remote addresses among the ports in a team. In one method, the ports are assigned on a round-robin basis in slot order, so that each new remote address is assigned to the next port and driver. This method is acceptable but requires memory in the intermediate driver 310 to store a cross-reference table between ports and assigned addresses. In another method, the Modulo function is applied using the remote address and the number of ports in the team. Typically, the last byte (8 bits) of the MAC address is used. For example, if the last byte is 10 and the number of ports is 4 (numbered 0=P1, 1=P2, 2=P3 and 3=P4), then 10 MOD 4=2, so that the port correspond remainder 2, or port P3, is selected. This method has the advantage in that each port is quickly selected and memory is not required to store a cross-reference table.

Figure 7:
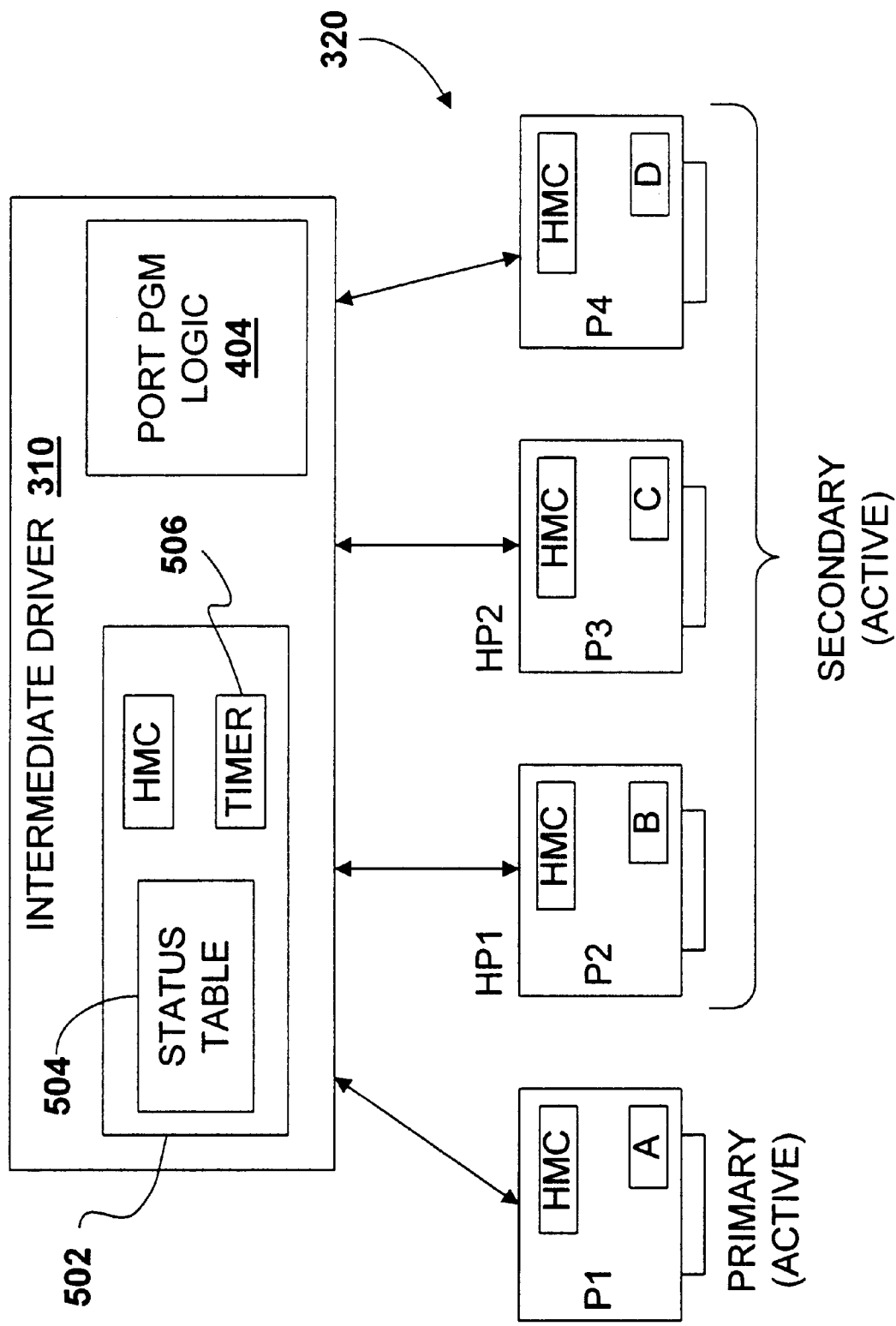
FIG. 7 is a block diagram illustrating the controller system of FIG. 3 configured for load balancing and a multiple receive address mode.

FIG. 7 illustrates the team 320 configured as load balancing mode in a multiple receive address mode. In the multiple receive address mode, each of the NIC drivers D1–D4 and the corresponding NICs N1–N4 of the ports P1–P4 are initially configured to receive packets having their own address A, B, C and D, respectively. The intermediate driver 310 also inserts the respective addresses A, B, C and D as the source address of packets sent via the respective ports P1–P4. All of the ports P1–P4 are active and one port, such as the port P1, is initially selected to be the primary port while the remaining ports, such as the ports P2–P4 are the secondary ports. The primary port is the handler of broadcast and multicast packets and carries the team node address, such as the address A, for the team 320. Load balancing with multiple receive address mode enables efficient operation for the IPX and NetBEUI protocols since these protocols are able to send and receive on each of the ports P1–P4 using the same send and receive addresses. In particular, the intermediate driver 310 inserts the source address A, B, C or D in each packet sent by the ports P1, P2, P3 or P4, respectively, so that remote devices send response packets directed to the specific address A, B, C or D. Thus, the send and receive loads are both more balanced among the NICs in a team using the multiple receive address mode.

For TCP/IP, each packet is sent with the same source address from any of the ports P1, where the source address is selected to be the same address as the primary port P1 and the same address that is associated with the corresponding IP address. Since the source address is the same and the receive addresses are different across the ports P1–P4, the network device 202 must be a hub or repeater. If the network device 202 is not a hub or repeater, then it must be a switch that supports aggregate port protocol and the ports P1–P4 are configured using the single receive address mode as previously described.

Figure 8:
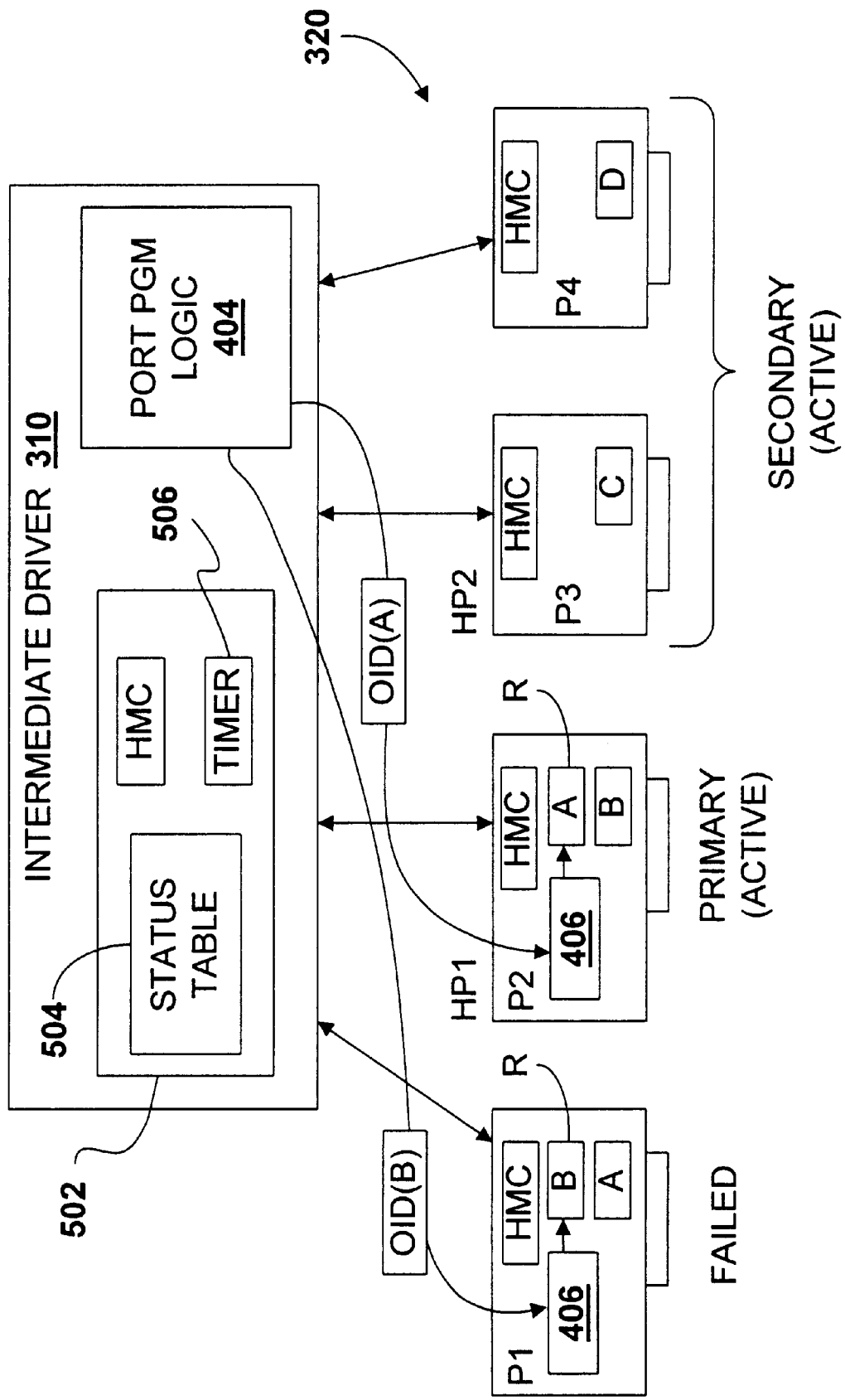
FIG. 8 is a block diagramn illustrating the controller system of FIG. 3 configured as shown in FIG. 7 performing a failover in the event of failure of the primary port.

FIG. 8 is a block diagram illustrating a failover for the team 320 when configured as load balancing mode in a multiple receive address mode. As shown in FIG. 8, if the intermediate driver 310 detects failure of the primary port P1, it selects another port, such as the port P2, as the primary port. In the multiple receive address mode as shown in FIG. 8, the intermediate driver 310 swaps receive addresses between the new primary port and the old active port P1, thereby preserving the correct node address on the network 200 for the computer system 100. In order to swap receive addresses, the port program logic 404 of the intermediate driver 310 sends OID commands with respective addresses B and A to the program logic 406 of the NIC drivers D1 and D2, which temporarily halt operation of the respective NICs N1 and N2, re-programs each of the override registers (R) with the desired new addresses (B and A, respectively), and then restarts the NMCs N1 and N2 in a similar manner as previously described. In this manner, a reboot is not required and the old primary failed port P1 is programmed with receive address B and the new primary port P2 is programmed with receive address A. As before, the network device 202, if operating as a switch, learns that address A has moved from link L1 to link L2.

FIGS. 7 and 8 illustrate that the multicast heartbeat packet method to check the status of the ports P1–P4 is used in the same manner. In particular, the intermediate driver 310 causes each of the NIC drivers D1–D4 and the corresponding NICs N1–N4 to register and store the Heartbeat Multicast Address HMC, and two heartbeat ports, such as the ports P2 and P3, are selected, labeled HP1 and HP2, respectively. Operation is similar as that shown in FIG. 6 where the intermediate driver 310 monitors reception of multicast heartbeat packets and maintains the status table 504. Upon failover to another port, such as the port P2 after the port P1 has failed, the intermediate driver 310 selects the two other ports P3 and P4 as the ports that send heartbeats.

Figure 9A:
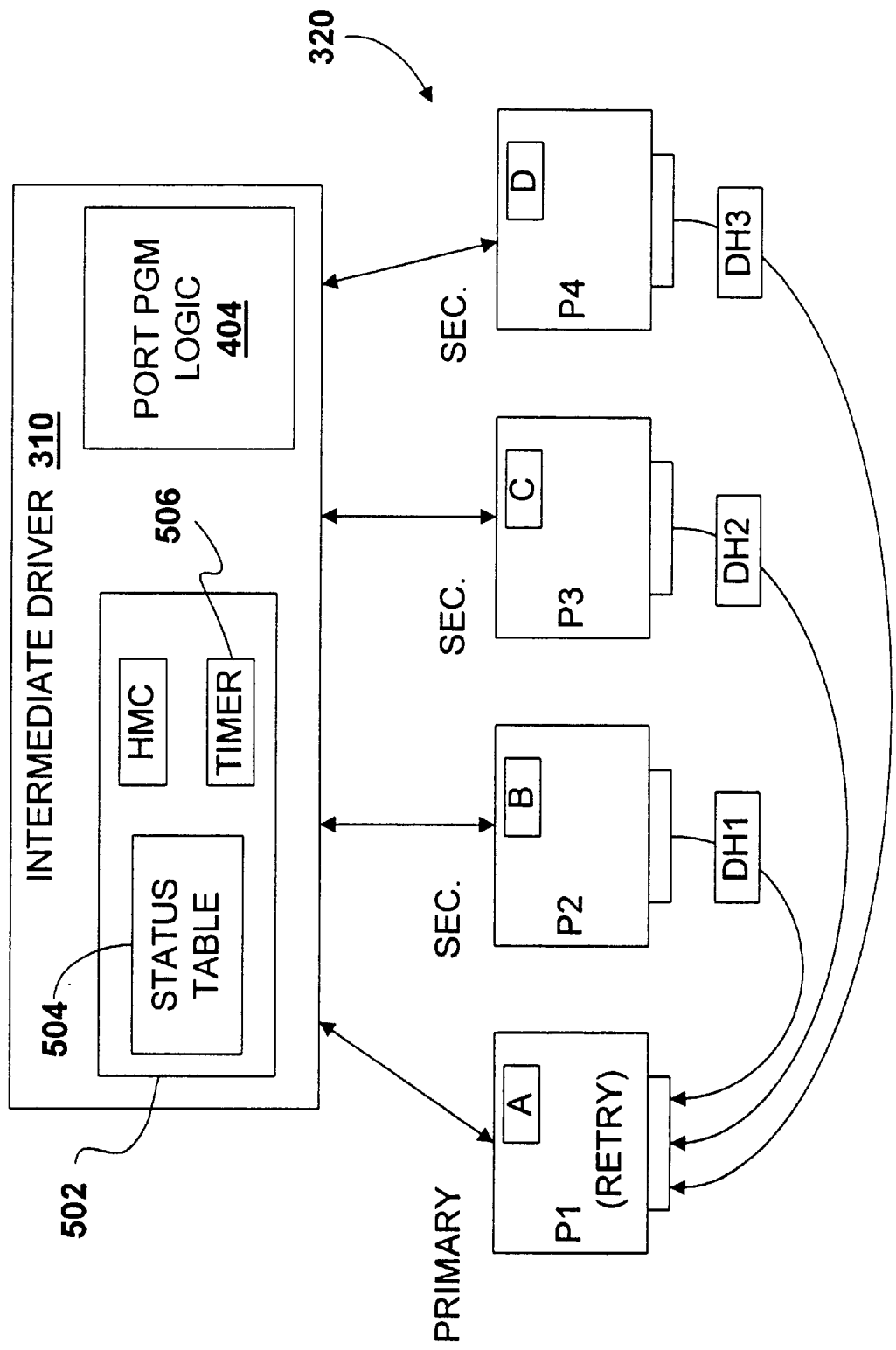
FIG. 9A is a block diagram of the controller system of FIG. 3 configured in a multiple receive address mode and using directed heartbeat packets to test the primary port.
Figure 9B:
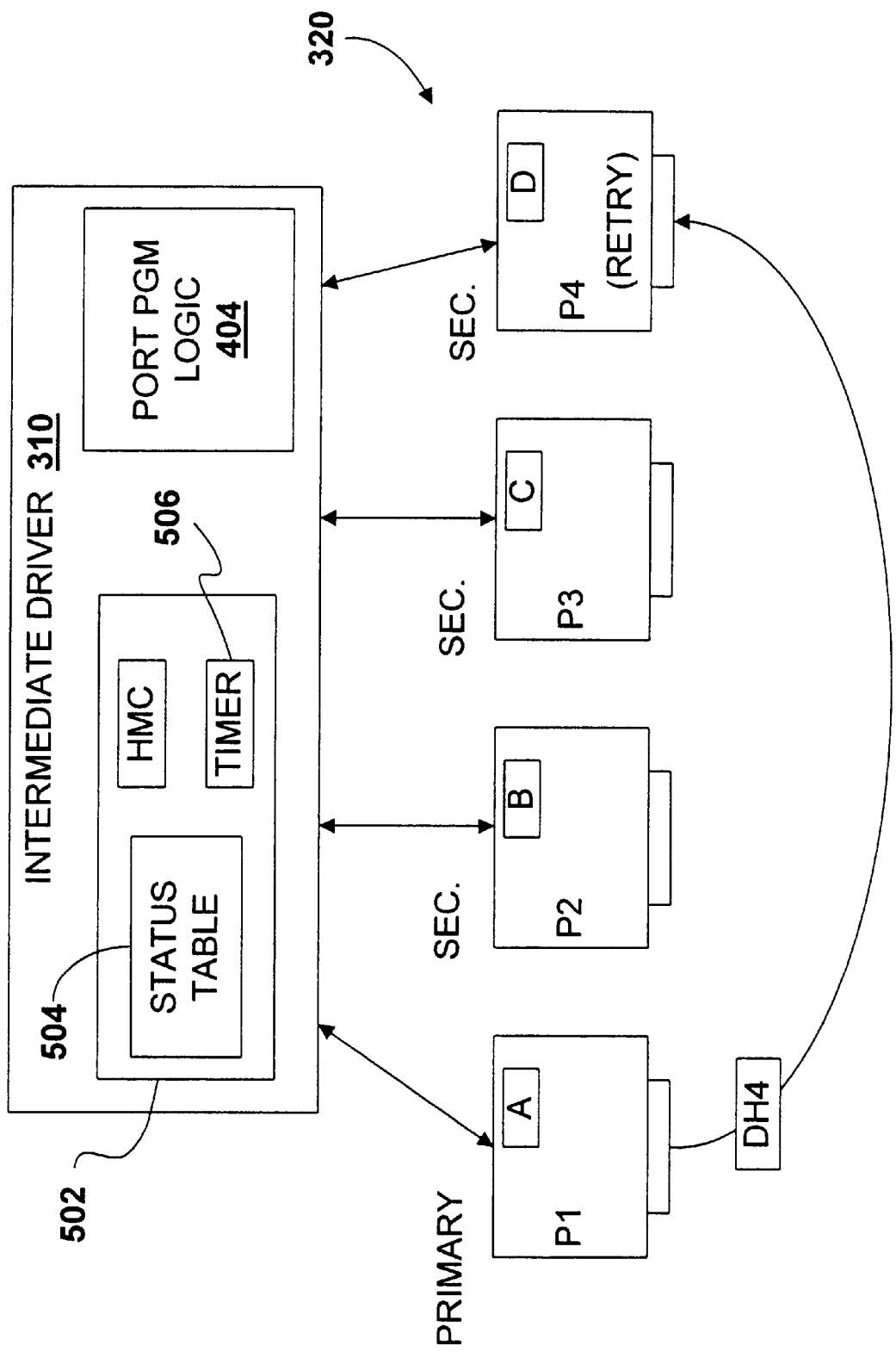
FIG. 9B is a block diagram of the controller system of FIG. 3 configured in a multiple receive address mode and using a directed heartbeat packet to test a secondary port.

When in the multiple receive address mode, it has been determined that an advanced heartbeat mode using directed packets is more efficient as shown in FIGS. 9A and 9B. In the advanced heartbeat mode, if the intermediate driver 310 detects that the primary port P1 has entered the RETRY state as listed in Table 1, then the intermediate driver 310 instructs each of the secondary ports P2, P3 and P4 to send a directed heartbeat packet (DH) to the primary port P1. As shown in FIG. 9A, the primary port P1 has entered the RETRY state and the ports P2, P3 and P4 are commanded by the intermediate driver 310 to send directed heartbeat packets DH1, DH2 and DH3, respectively, to the primary port P1. The heartbeat packet DH1 from P2 has source address B and destination address A, the heartbeat packet DH2 for P3 has source address C and destination address A, and the heartbeat packet DH3 from P4 has source address D and destination address A. In this manner, even if the network device 202 operates as a hub or repeater and sends all of the directed heartbeat packets DH1, DH2 and DH3 to all of the other devices in the network 200, such as the devices 204, 206 and 208, the other devices simple drop or otherwise ignore the packets and do not try to process the DH packets since the destination address of the DH packets specify another device. As shown in FIG. 9B, if any of the secondary ports, such as the port P4, enters the RETRY state, then only the primary port P1 sends a directed heartbeat packet DH4 to the port in the RETRY state. The heartbeat packet DH4 has source address A and destination address D.

Figure 10:
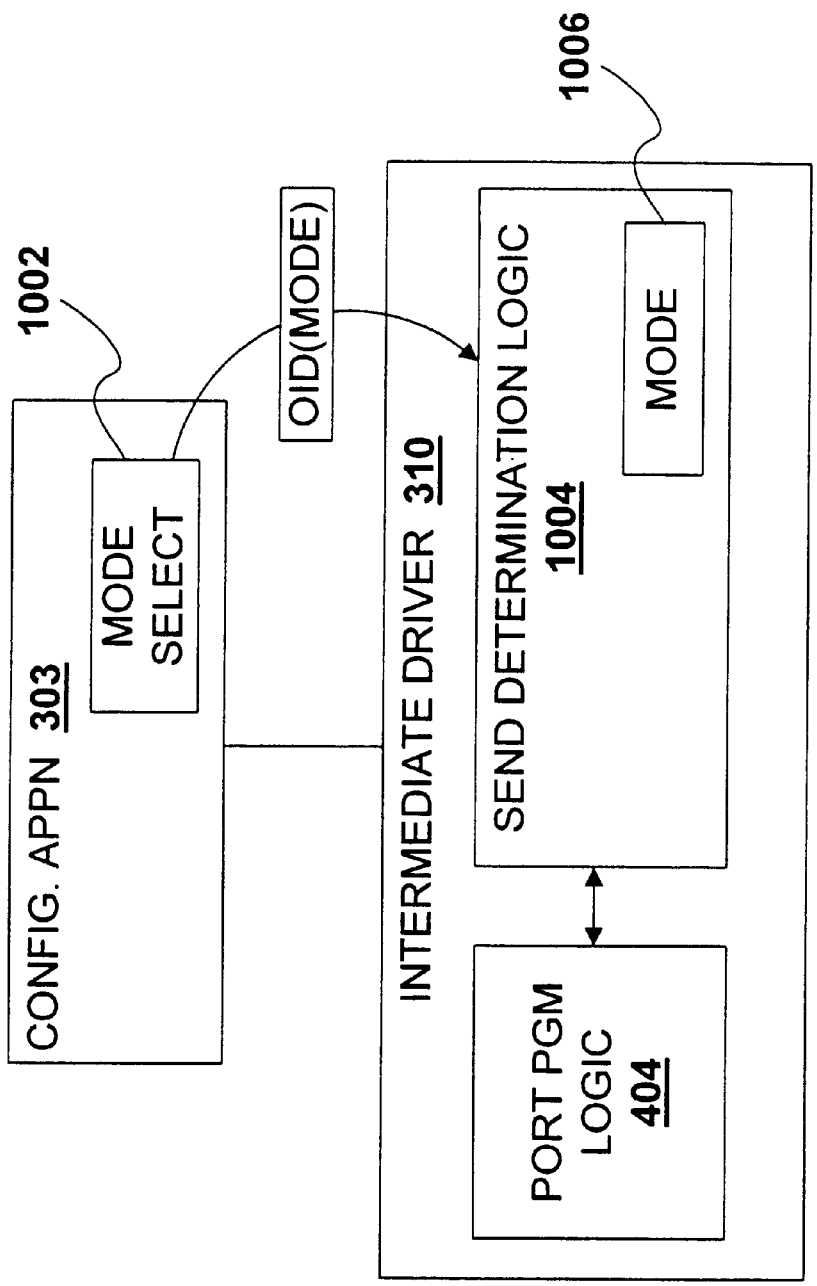
FIG. 10 is a block diagram illustrating the controller system of FIG. 3 supporting dynamic mode switching between any of several different modes without requiring that the computer system be rebooted.

FIG. 10 is a block diagram illustrating that the controller system 300 also supports dynamic mode switching between any of the modes without requiring that the computer system be rebooted. As described above, two or more NIC ports and associated drivers may be configured as a team to operate in any one of several modes, including a fault tolerance mode and a load balancing or sharing mode. If conditions of the computer system 100 or the network 200 change, it may be desired to change the mode of one or more teams of the computer system 100. Such mode change might otherwise require that the computer system 100 be rebooted. Rebooting the computer system 100, however, is not always a desirable option since it may result in loss of productivity. This is particularly true of the computer system 100 is a critical server of the network 200. It is desired to optimize the team configuration and operating mode without disrupting network stability.

As shown in FIG. 10, the configuration application 303 also includes mode select code or a mode select module 1002 that enables a user to select any of the supported operating modes of the ports of the NICs coupled to the computer system 100, such as the NICs N1–N4. The mode select module 1002 then sends one or more OIDs to send determination logic 1004 of the intermediate driver 310, including an OID with a mode value indicative of a desired operating mode. The send determination logic 1004 cooperates with the port program logic 404 to re-program the receive addresses of the ports P1–P4, if necessary. As previously described, the port program logic 404 sends OID commands to the NIC drivers, which temporarily halts operation of corresponding NICs, re-programs each of the override registers (R) with the desired new address, and then restarts the NICs without rebooting. The OID(mode) from the mode select module 1002 is used to program a memory control block 1006 with a MODE value indicative of the selected mode of operation without having to reboot the computer system 100. During operation, the intermediate driver 310 and the send determination logic 1004 include operating mode switch statements that maintain the functionality of the selected mode as identified by the MODE value in the memory control block 1006. The intermediate driver 310 consults the send determination logic 1004 to determine how to send each packet, such as which port to use and which address to use as the source address in accordance with the particular selected mode of operation. Since the ports and the memory control block 1006 are re-programmed without rebooting and since the mode is consulted or read to send each packet, the user is able to dynamically select any mode at any time without having to reboot the computer system 100.

Figure 11:
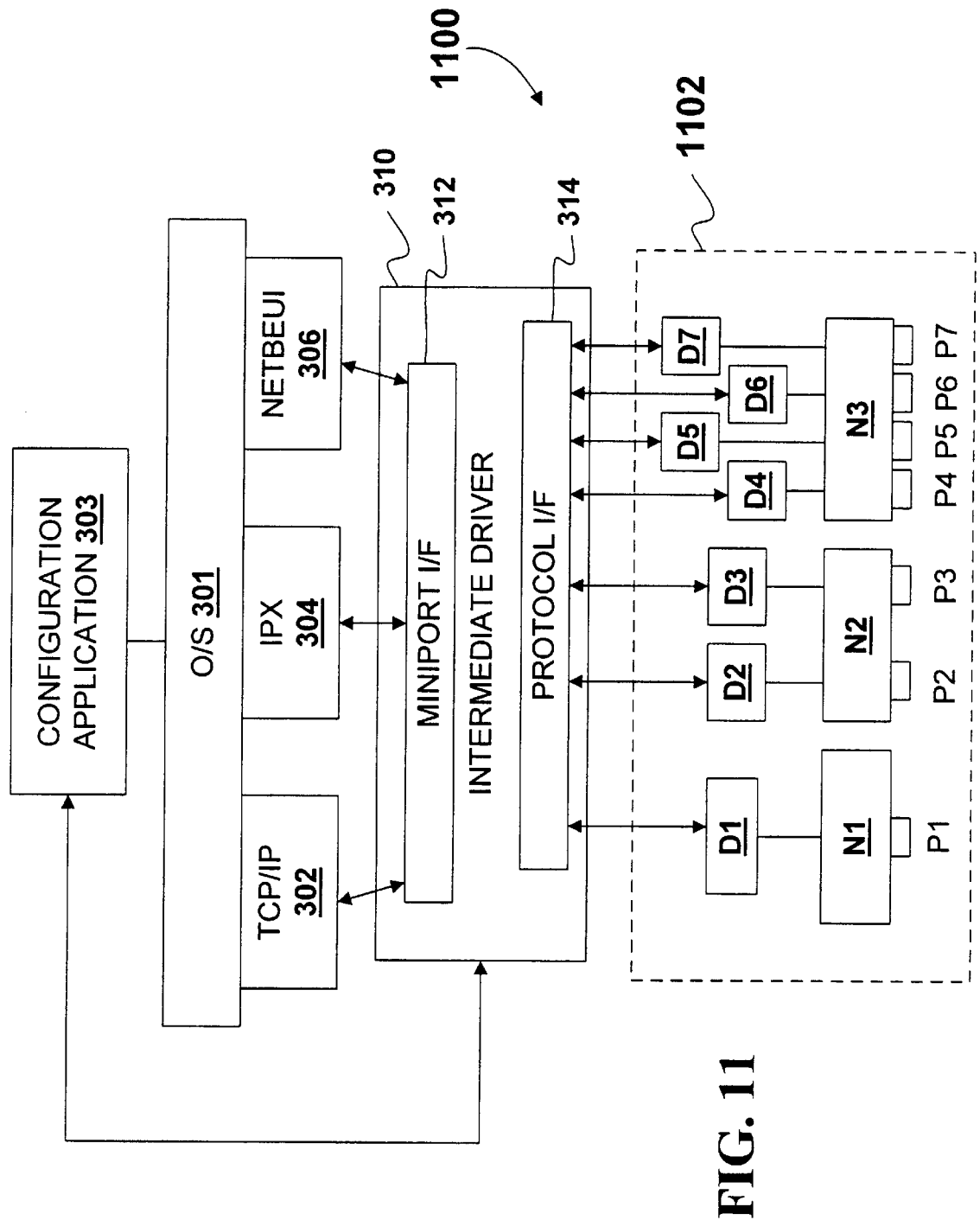
FIGS. 11 and 12 are block diagrams illustrating controller configurations that are possible for a controller system according to the present invention.
Figure 12:
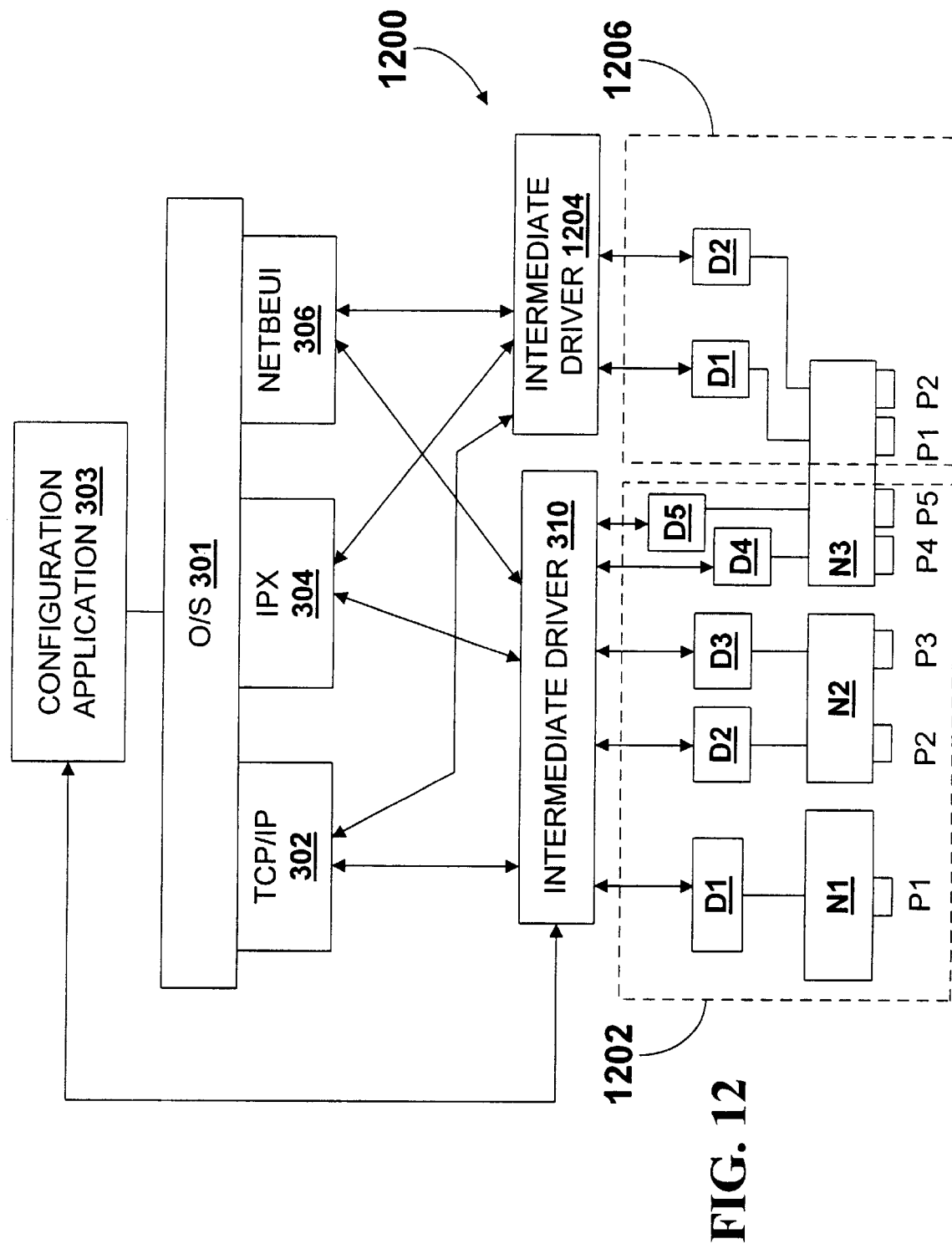

FIGS. 11 and 12 are block diagrams illustrating controller configurations that are possible for a controller system according to the present invention. In FIG. 11, a controller system 1100 is illustrated that includes the O/S 301, the configuration application 303, the intermediate driver 310 and the TCP/IP 302, IPX 304 and NetBEUI 306 protocols. The intermediate driver 310 includes the miniport I/F 312 and the protocol I/F 314 as previously described. Three NICs N1, N2 and N3 are shown, where NICs N2 and N3 are multiple port NICs. In particular, the NIC N2 includes two ports and the NIC N3 includes four ports. The user, via interaction with the configuration application 303, has configured all seven of the ports of the NICs N1–N3 together into a single team 1102 to form ports P1, P2, P3, P4, P5, P6 and P7 (P1–P7) of the team 1102. For each port P1–P7, a separate driver D1–D7, respectively, is provided. Each of the drivers D1–D7 bind to the protocol I/F 314 of the intermediate driver 310 in a similar manner as previously described. The team 1102 may be configured in any of the modes previously described, such as fault tolerance or load balancing, along with the appropriate receive address configuration, such as either of the single or multiple receive address modes.

In FIG. 12, a controller system 1200 is shown in a different configuration in which the user has configured the single port of NIC N1, the two ports of NIC N2 and two of the ports of NIC N3 into a first team 1202 with five ports P1–P5 using the intermediate driver 310. Drivers D1–D5 are used for ports P1–P5, respectively, in a similar manner as the controller system 1100. For the controller system 1200, however, the last two ports of the NIC N3 are configured instead as ports P1 and P2 of a separate team 1206 using a separate intermediate driver 1204. The intermediate driver 1204 operates in substantially the same manner as the intermediate driver 310, except that it is used for a different team. The drivers D6 and D7 of the controller system 1100 are instead configured as drivers D1 and D2 for the ports P1 and P2, respectively, of the controller system 1200. The drivers D1, D2 each bind to the protocol I/F (not shown) of the intermediate driver 1204. The intermediate driver 1204 also binds to the TCP/IP 302, IPX 304 and NetBEUI 306 protocols via a corresponding miniport I/F (not shown).

FIGS. 11 and 12 illustrate that a controller system according to the present invention is port-centric and enables a user to configure ports in any desired manner regardless of whether the ports are located on the same NIC. The seven ports P1–P7 may be configured in any combination and in up to three (3) different teams using three different intermediate drivers, where each team includes at least two ports. Also, any one or more of the ports may be configured independently in which the corresponding driver directly binds to any one of the upper level protocols, such as the TCP/IP 302, IPX 304 and NetBEUI 306 protocols.

Figure 13:
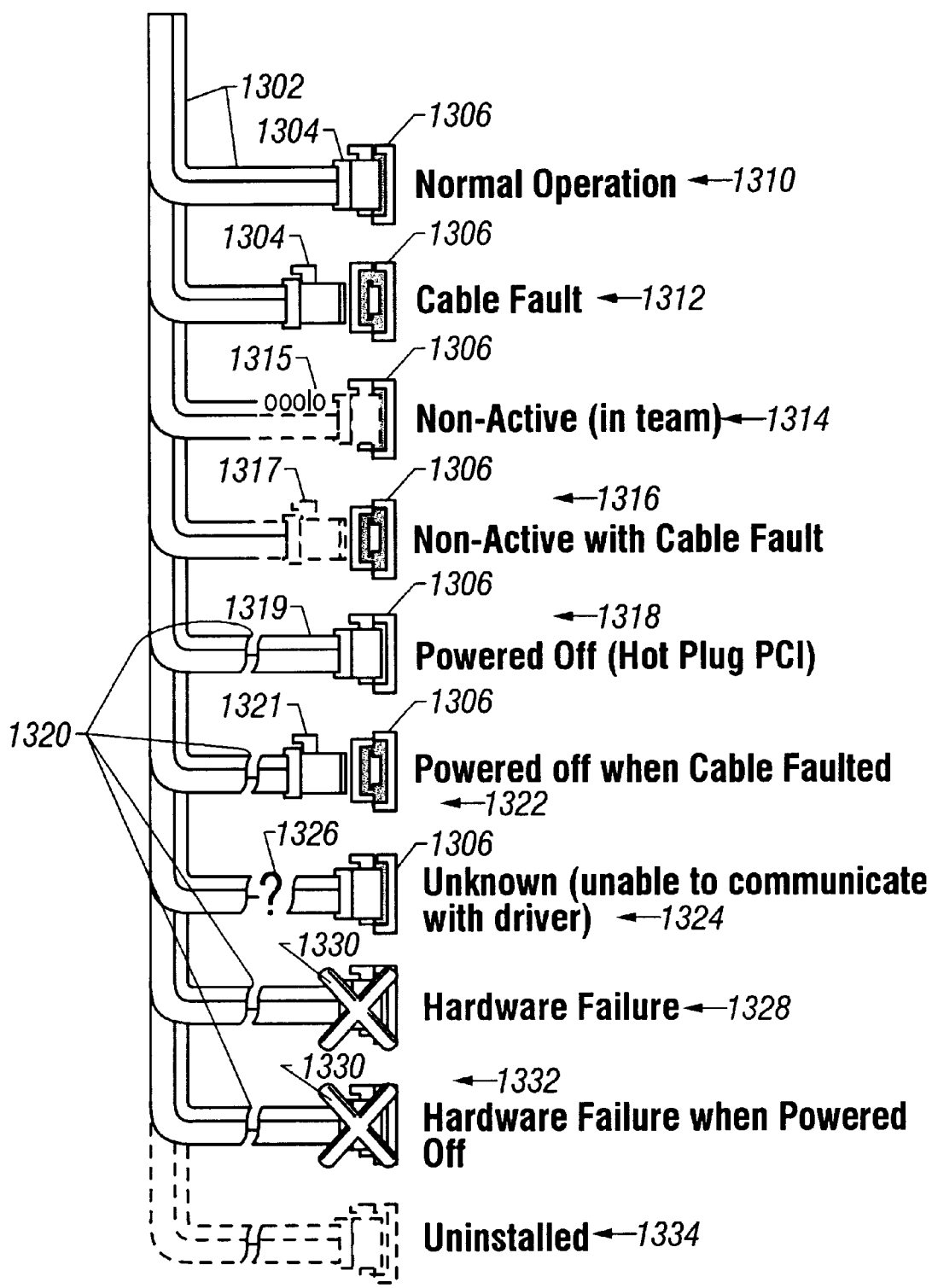
FIGS. 13 and 14 are graphic representations illustrating port status designations for any one or more ports of a computer system.
Figure 14:
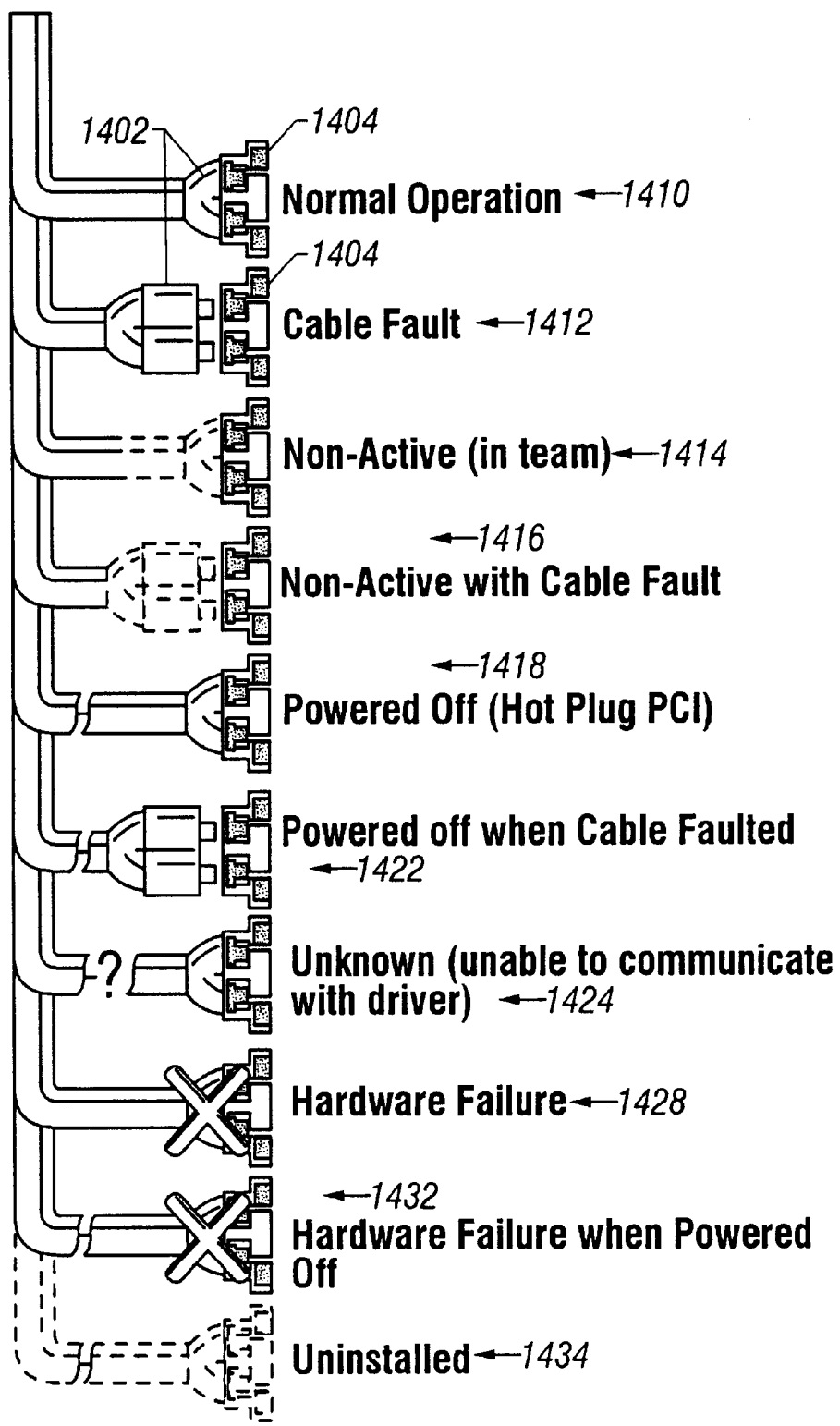

FIGS. 13 and 14 are graphic representations illustrating port status designations for any one or more ports of a computer system, such as the computer system 100. FIG. 13 illustrates Base-T (TX) cabling designations and FIG. 14 illustrates corresponding Fiber (FX) cabling designations. The graphic designations are icons illustrated in bitmap form, and are displayed on the display 112 by the configuration application 303 so that the user has a visual representation of the designation for each port. It is understood, however, that any acceptable graphic format may be used to visually illustrate the appropriate designation information. FIGS. 13 and 14 illustrate port representations rather than NIC representations providing a more accurate depiction of the controller and port configurations.

The intermediate driver of each team monitors the status of each port in its team and reports the status of each port to the configuration application. Also, the configuration application retrieves status information from respective drivers of ports operating independently or stand-alone. The configuration application displays the status of each port in graphical form on the display 112. The status of each port is preferably updated continuously or periodically, such as after every timeout of a predetermined time period. The time period is preferably short enough to provide the user with relatively recent and accurate port status, such as every few seconds. The configuration application correspondingly updates the graphic representations displayed to keep the user informed of port status.

Normal operation is generally represented using solid graphics including plug and jack graphics interfacing each other. A cable fault is detected when the cable, or otherwise the link signal at the port, is no longer detected. A cable fault is represented with a plug graphic removed from a jack graphic. A different level of shading or masking is used to convey a non-active or standby port. Partial shading is used to illustrate a powered off condition. A graphic symbol icon, such as an "X" or the like, is used to indicate failure. A cable break is also used to illustrate the powered off and failure conditions. An unknown condition is illustrated using a suitable symbol icon, such as a question mark "?" or the like. A team is shown using a team symbol icon along with a separate cable link. Any combination of the shading, graphics and symbols may be used to illustrate corresponding combined conditions. In alternative embodiments, color or shades of gray may be used in the alternative or in addition to different shading, masking or symbols. For example, a failed condition may be conveyed using a red-colored "X" on the port graphic icon, or any different color may be used instead of shading or masking to convey non-active, powered or failed conditions.

In FIG. 13, each port designation includes a solid cable graphic icon 1302 illustrating a corresponding port. For Base-T, each port designation also includes a corresponding plug graphic icon 1304 and jack graphic icon 1306. A normal operation graphic icon 1310 illustrates normal operation including a solid cable graphic icon 1302 with the plug graphic icon 1304 interfacing the jack graphic icon 1306. A cable fault graphic icon 1312 is similar to the normal operation graphic icon 1310 but shows the plug graphic icon 1304 removed from the corresponding jack graphic icon 1306. The cable fault graphic icon 1312 is used for cases in which the port is installed but the cable is pulled or non-functional so that link is not detected. A non-active graphic icon 1314 is similar to the normal graphic icon 1310 in which the plug graphic icon 1304 is shown interfacing the jack graphic icon 1306. However, the non-active graphic icon 1314 includes a shaded (or masked) cable graphic icon 1315 indicating that the port is in standby or non-active mode. The non-active graphic icon 1314 is used to illustrate a standby port of a team. A non-active cable with fault graphic icon 1316 is similar to the non-active graphic icon 1314 except including a shaded cable and plug graphic icon 1317 in which the plug graphic icon is shown removed from the corresponding jack graphic icon 1306. The non-active with cable fault graphic icon 1316 is used to illustrate a standby port combined with a cable fault.

A powered off graphic icon 1318 illustrates an installed NIC in which the slot is powered off. The ability to separately enable or disable power to any slot, such as any of the slots S1–S4 of the computer system 100, enables replacement or otherwise hot-plugging of the slot with another controller, if desired. The powered off graphic icon 1318 includes a cable break graphic icon 1320 and a partially shaded cable and plug graphic icon 1319 with the plug graphic icon interfacing the corresponding jack graphic icon 1306. A powered off when cable faulted graphic icon 1322 is similar to the powered off graphic icon 1318 except that a partially shaded cable and plug graphic icon 1321 illustrates a plug graphic icon removed from the jack graphic icon 1306.

An unknown state graphic icon 1324 includes an appropriate graphic icon symbol 1326, such as a question mark (?) or the like, to illustrate an unknown condition of the NIC. Usually, the unknown state graphic icon 1324 indicates that hardware (a NIC) has been detected in a slot of the computer and that a driver instance has been provided. The computer must be rebooted, however, to recognize the new NIC and driver configuration. A hardware failure graphic icon 1328 is similar to the normal graphic icon 1304 except including a cable break 1320 and an appropriate graphic symbol icon 1330, such as an "X" mark or the like, to illustrate a failed controller. A hardware failure when powered off graphic icon 1332 is provided that is similar to the hardware failure graphic icon 1328 except partially shaded to convey a combined powered off condition. An uninstalled graphic icon 1334 indicates that hardware, such as a NIC, has been detected but a driver instance has not been installed for the NIC. Once a driver instance is provided for the detected NIC, the uninstalled graphic icon 1334 changes to the unknown state graphic icon 1324, which further changes to one of the other known graphic conditions after the computer is rebooted.

FIG. 14 illustrates graphic representations of Fiber (FX) cabling port type designations for any one or more ports of a computer system, such as the computer system 100. The graphic icons correspond to the graphic icons of FIG. 13 except using a fiber plug graphic icon 1402 and corresponding fiber jack graphic icon 1404. In particular, FIG. 14 shows fiber cable graphic icon representations including a normal operation graphic icon 1410, a cable fault graphic icon 1412, a non-active graphic icon 1414, a non-active with cable fault graphic icon 1416, a powered off graphic icon 1418, a powered off when cable faulted graphic icon 1422, an unknown state graphic icon 1424, a hardware graphic icon 1428, a hardware failure when powered off graphic icon 1432 and an uninstalled graphic icon 1434.

Figure 15:
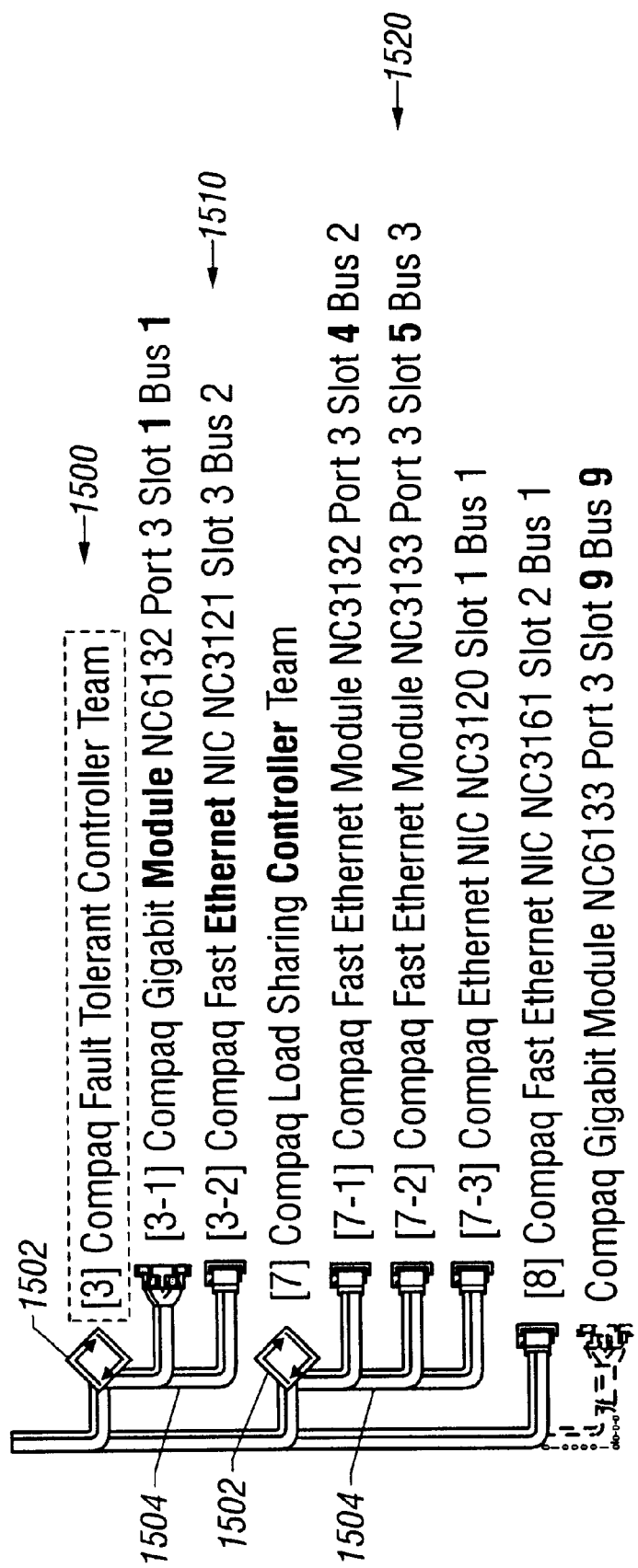
FIG. 15 is a graphic representation illustrating port configurations including teams installed on a computer system.

FIG. 15 is a graphic representation of a port configuration 1500 including teams installed on a computer system. A team graphic icon 1502 and an extension link graphic icon 1504 are used to designate each team, such as teams 1510 and 1520. The team 1510 is given a team number of 3 and labeled "Compaq Fault Tolerant Controller Team", indicating that the team 1510 is operating in a fault tolerance mode. The team 1510 includes two ports, labeled 3-1 and 3-2, respectively, where port 3-1 is a fiber optic port in active mode and port 3-2 is a Base-T port in standby mode. The label following each port symbol in the team 1510 denotes the team number and port number of the team (team-port), the manufacturer and type of the particular controller card, the port number of the particular NIC (if a multiple port NIC), the slot number of the particular bus and the bus number. For example, port 3-1 of the team 1510 comprises port 3 of a multiple port Compaq Gigabit Module NC6132 by Compaq Computer Corporation (Compaq) plugged into slot number 1 of bus number 1. The port 3-2 of the team 1510 comprises a single-port Compaq Fast Ethernet NIC NC3121 plugged into slot 3 of bus 2. It is noted that the computer system has multiple buses, each given a particular bus number to facilitate identification and location of the controllers. In the embodiment shown, the computer system includes at least 9 different PCI buses.

The other team 1520, numbered 7 and labeled "Compaq Load Sharing Controller Team", includes 3 ports labeled 7-1, 7-2 and 7-3, respectively. The team 1520 is configured to operate in a load sharing mode in which all three ports 7-1, 7-2 and 7-3 are active. A stand-alone port (8) is also included comprising a single-port Compaq Fast Ethernet NIC NC3161 by Compaq plugged into slot 2 of bus 1 and is in active mode. Finally, an uninstalled, stand-alone port comprising port 3 of a multiple port Compaq Gigabit Module NC6133 is plugged into slot 9 of bus 9. The user may use a configuration application, such as the configuration application 303, to install the uninstalled port, although the computer system must be rebooted to complete the installation. Further, the stand-alone teams may be joined to form a third team or one or both of the stand-alone ports may be moved into either of the existing teams 1510 or 1520. Any such re-grouping of the ports, however, requires rebooting of the computer to implement.

It is now appreciated that a port-centric controller system according to the present invention provides a user with a more accurate representation of the status and configuration of each port in a computer. Rather than displaying each port as a controller, the status and configuration of each port is represented using appropriate port-specific icons. The team configurations are also illustrated in an accurate manner so that the user is able to easily determine and re-configure the one or more teams of ports.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A port-centric controller system for a computer, comprising:
   a plurality of network controllers, each including at least one network port, the plurality of network controllers implementing a plurality of network ports;
   a driver system capable of operating each of the plurality of network ports in either one of a stand-alone mode and a team mode in which a team includes at least two of the plurality of network ports acting like a single virtual or logical device;
   the driver system monitoring the status of each of the plurality of network ports; and
   configuration logic that interfaces the driver system and that includes logic that is used to display port-specific graphic representations of the configuration and status of each of the plurality of network ports.

2. The port-centric controller system of claim 1, further comprising:
   the graphic representations distinguishing between each of the plurality of network controllers and each of the plurality of network ports.

3. The port-centric controller system of claim 1, further comprising:
   the driver system monitoring the link status of each of the plurality of network ports indicative of cable status; and
   the graphic representations including a cable fault icon indicative of a cable fault at a network port.

4. The port-centric controller system of claim 1, further comprising:
   the graphic representations including separate icons for a powered off status and a hardware failure status.

5. The port-centric controller system of claim 1, further comprising:
   the graphic representations including separate icons for a powered off status and a cable fault status.

6. The port-centric controller system of claim 1, further comprising:
   the graphic representations including separate icons for a hardware failure status and cable fault status.

7. The port-centric controller system of claim 1, further comprising:
   the graphic representations including an icon representing a powered off when cable faulted status.

8. The port-centric controller system of claim 1, further comprising:
   the graphic representations including an icon representing a hardware failure when powered off status.

9. The port-centric controller system of claim 1, further comprising:
   the graphic representations including an icon representing detection of an uninstalled network controller.

10. The port-centric controller system of claim 1, further comprising:
    the graphic representations including an icon representing each network port in a team of network ports.

11. The port-centric controller system of claim 10, further comprising:
    the graphic representations including an icon representing a non-active network port in the team of network ports.

12. The port-centric controller system of claim 10, further comprising:

the graphic representations including team, controller, slot and bus information.

13. A computer system, comprising:

a processor;

a main memory;

a bus system coupled to the processor and the main memory;

a plurality of network controllers, each coupled to the bus system and each including at least one network port, the plurality of network controllers implementing a plurality of network ports;

a driver system, executed by the processor from the main memory, that is capable of operating each of the plurality of network ports in either one of a stand-alone mode and a team mode in which a team includes at least two of the plurality of network ports acting like a single virtual or logical device;

the driver system monitoring the status of each of the plurality of network ports; and a configuration application, executed by the processor from the main memory, that interfaces the driver system and that is used to display port-specific graphic representations of the configuration and status of each of the plurality of network ports.

14. The computer system of claim 13, further comprising:

the graphic representations distinguishing between each of the plurality of network controllers and each of the plurality of network ports.

15. The computer system of claim 13, further comprising:

the graphic representations including a cable fault icon indicative of a cable fault at a network port.

16. The computer system of claim 13, further comprising:

the graphic representations including separate icons for a powered off status, a hardware failure status and a cable fault status.

17. The computer system of claim 13, further comprising:

the graphic representations including an icon representing a powered off when cable faulted status.

18. The computer system of claim 13, further comprising:

the graphic representations including an icon representing each network port in a team of network ports.

19. The computer system of claim 18, further comprising:

the graphic representations including an icon representing a non-active network port in the team of network ports.

20. The computer system of claim 13, further comprising:

the graphic representations including team, controller, slot and bus information.

\* \* \* \* \*